(12) United States Patent
Grabowski et al.

(10) Patent No.: US 11,153,435 B2
(45) Date of Patent: *Oct. 19, 2021

(54) METHOD AND SYSTEM FOR AUTOMATICALLY BLOCKING ROBOCALLS

(71) Applicants: Joseph D. Grabowski, Sanford, FL (US); Ernest F. Falco, III, Longwood, FL (US)

(72) Inventors: Joseph D. Grabowski, Sanford, FL (US); Ernest F. Falco, III, Longwood, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/068,018

(22) Filed: Oct. 12, 2020

(65) Prior Publication Data

US 2021/0092228 A1    Mar. 25, 2021

Related U.S. Application Data

(63) Continuation-in-part of application No. 16/580,825, filed on Sep. 24, 2019, now Pat. No. 10,805,458.

(51) Int. Cl.

| | |
|---|---|
| *H04M 3/436* | (2006.01) |
| *H04M 3/42* | (2006.01) |
| *H04M 3/22* | (2006.01) |
| *H04M 7/00* | (2006.01) |
| *G06N 5/02* | (2006.01) |
| *H04W 4/16* | (2009.01) |

(52) U.S. Cl.
CPC ............ *H04M 3/436* (2013.01); *G06N 5/022* (2013.01); *H04M 3/2218* (2013.01); *H04M 3/42059* (2013.01); *H04M 7/006* (2013.01); *H04W 4/16* (2013.01); *H04M 2203/2027* (2013.01); *H04M 2203/553* (2013.01); *H04M 2203/6027* (2013.01)

(58) Field of Classification Search
CPC combination set(s) only.
See application file for complete search history.

(56) References Cited

U.S. PATENT DOCUMENTS

| | | |
|---|---|---|
| 5,706,338 A | 1/1998 | Relyea et al. |
| 5,806,040 A | 9/1998 | Vensko |
| 6,163,604 A | 12/2000 | Baulier |
| 8,325,893 B2 | 12/2012 | Vendrow |
| 8,463,765 B2 | 6/2013 | Lesavich |
| 8,942,357 B2 | 1/2015 | Goulet |
| 9,037,564 B2 | 5/2015 | Lesavich et al. |
| 9,060,057 B1 * | 6/2015 | Danis .................. H04L 63/083 |
| 9,137,250 B2 | 9/2015 | Lesavich et al. |
| 9,361,479 B2 | 6/2016 | Lesavich et al. |
| 9,569,771 B2 | 2/2017 | Lesavich et al. |

(Continued)

*Primary Examiner* — Duc Nguyen
*Assistant Examiner* — Assad Mohammed
(74) *Attorney, Agent, or Firm* — Lesavich High-Tech Law Group, S.C.; Stephen Lesavich

(57) ABSTRACT

A method and system for automatically blocking robocalls. A set of incoming call data is captured from the incoming call. The set of incoming call data, including captured audio data, is checked with plural different tests to determine if the robocall includes a voice call component. The plural different tests provide additional levels of detection for robocalls. The method and system automatically identify and process robocalls and help prevent call spoofing and neighbor spoofing by robocalls.

20 Claims, 23 Drawing Sheets

(56) References Cited

U.S. PATENT DOCUMENTS

| | | |
|---|---|---|
| 9,809,439 B2 | 11/2017 | Falco, III |
| 9,860,376 B1* | 1/2018 | Foss .................. H04M 3/436 |
| 9,912,688 B1 | 3/2018 | Shaw et al. |
| 10,111,102 B2 | 10/2018 | Flaks |
| 10,205,699 B1 | 2/2019 | Koster |
| 10,205,825 B2 | 2/2019 | Dowlatkhah et al. |
| 10,257,349 B1 | 4/2019 | Isgar |
| 10,306,059 B1* | 5/2019 | Bondareva .......... H04M 3/5166 |
| 10,455,085 B1 | 10/2019 | Roundy |
| 10,805,458 B1 | 10/2020 | Grabowski et al. |
| 2004/0131164 A1 | 7/2004 | Gould |
| 2006/0210032 A1 | 9/2006 | Grech |
| 2007/0026372 A1 | 2/2007 | Huelsbergen |
| 2010/0158233 A1 | 6/2010 | Caceres |
| 2011/0159856 A1 | 6/2011 | Walsh |
| 2011/0208710 A1 | 8/2011 | Lesavich |
| 2012/0185307 A1 | 7/2012 | Bookstaff |
| 2012/0278622 A1 | 11/2012 | Lesavich et al. |
| 2013/0216027 A1 | 8/2013 | Rados |
| 2014/0185786 A1* | 7/2014 | Korn .................... H04M 3/4936 379/210.02 |
| 2014/0189792 A1 | 7/2014 | Lesavich et al. |
| 2014/0192965 A1 | 7/2014 | Almeida |
| 2015/0046214 A1* | 2/2015 | Jain .................... G06Q 30/0201 705/7.29 |
| 2015/0195403 A1 | 8/2015 | Goulet |
| 2015/0288816 A1* | 10/2015 | Kahn .................... H04M 3/436 455/413 |
| 2015/0302730 A1 | 10/2015 | Geerlings |
| 2015/0379301 A1 | 12/2015 | Lesavich et al. |
| 2016/0063572 A1 | 3/2016 | Brown |
| 2016/0068383 A1 | 3/2016 | Falco, III |
| 2016/0321654 A1 | 11/2016 | Lesavich et al. |
| 2018/0046967 A1 | 2/2018 | Ghosh |
| 2018/0131799 A1 | 5/2018 | Kashimba |
| 2018/0167294 A1 | 6/2018 | Gupta |
| 2018/0310159 A1 | 10/2018 | Katz |
| 2019/0174000 A1 | 6/2019 | Bharrat |

* cited by examiner

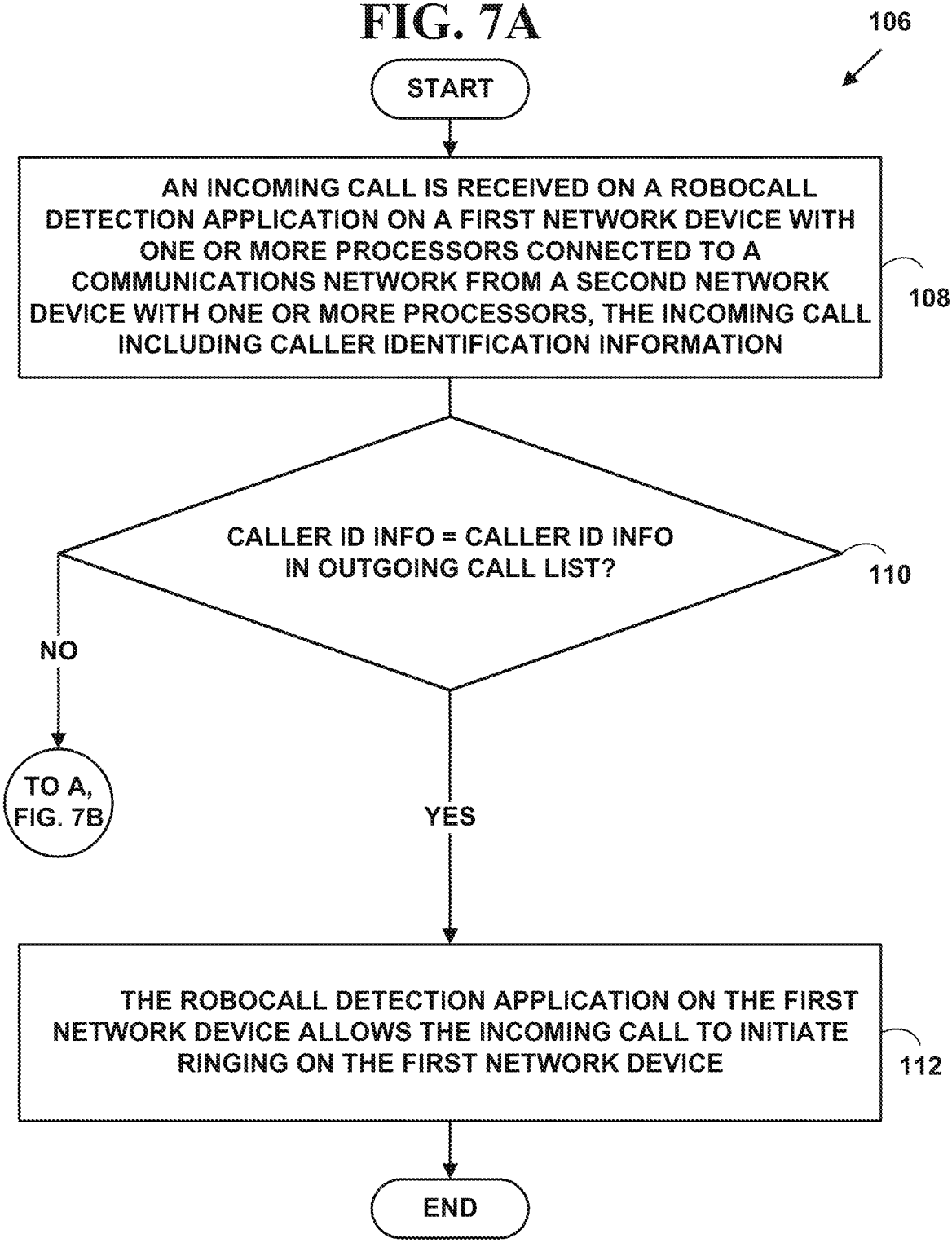

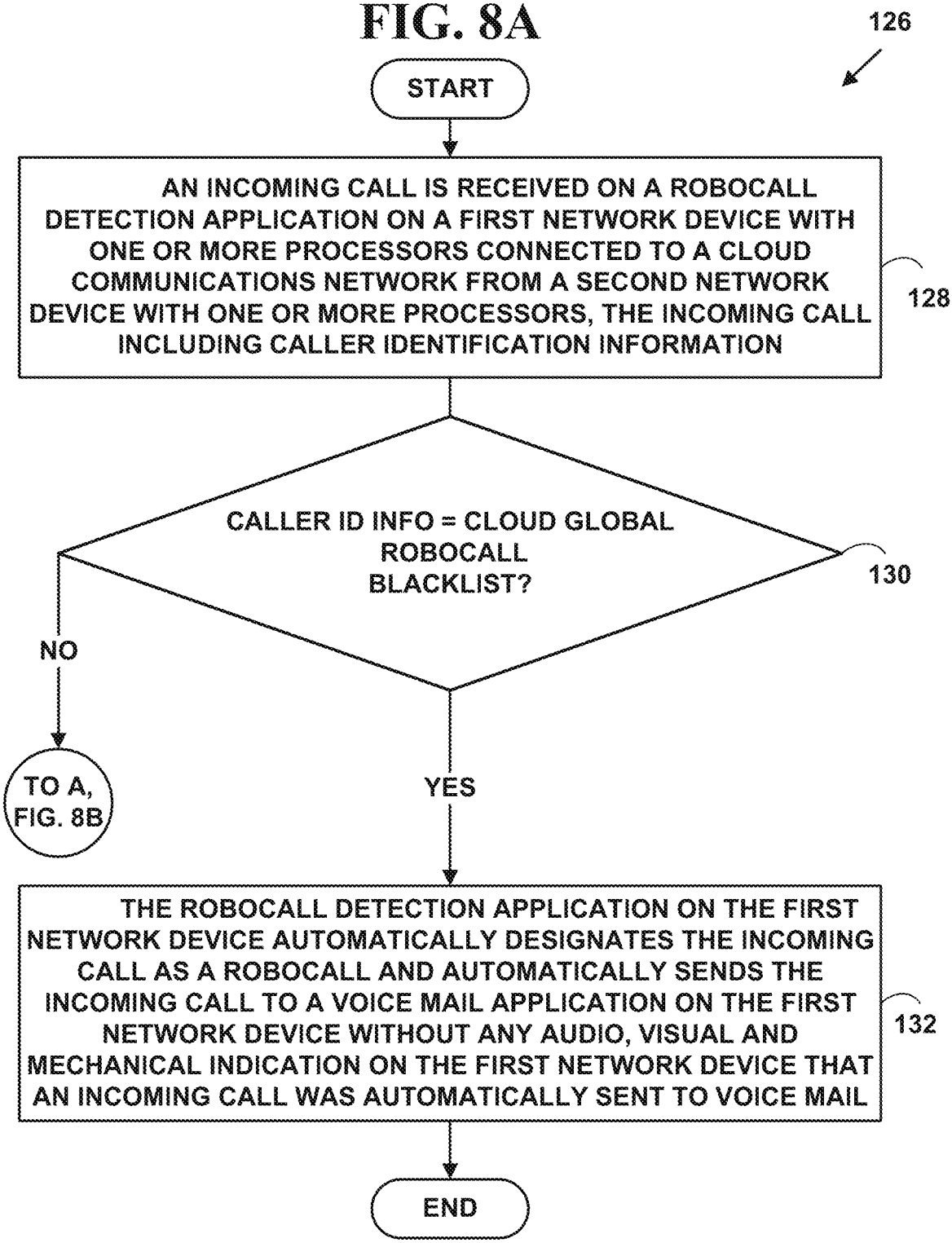

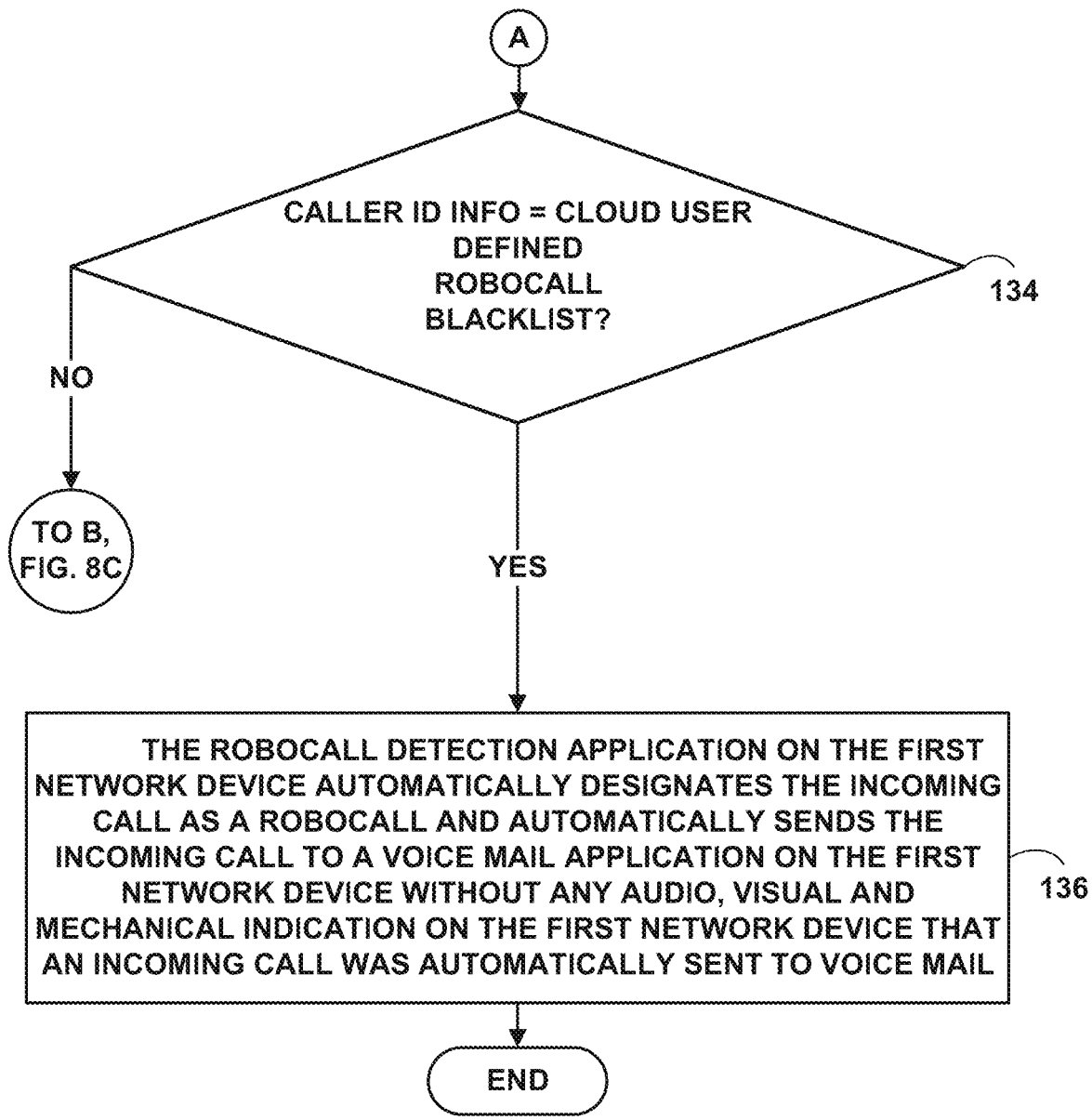

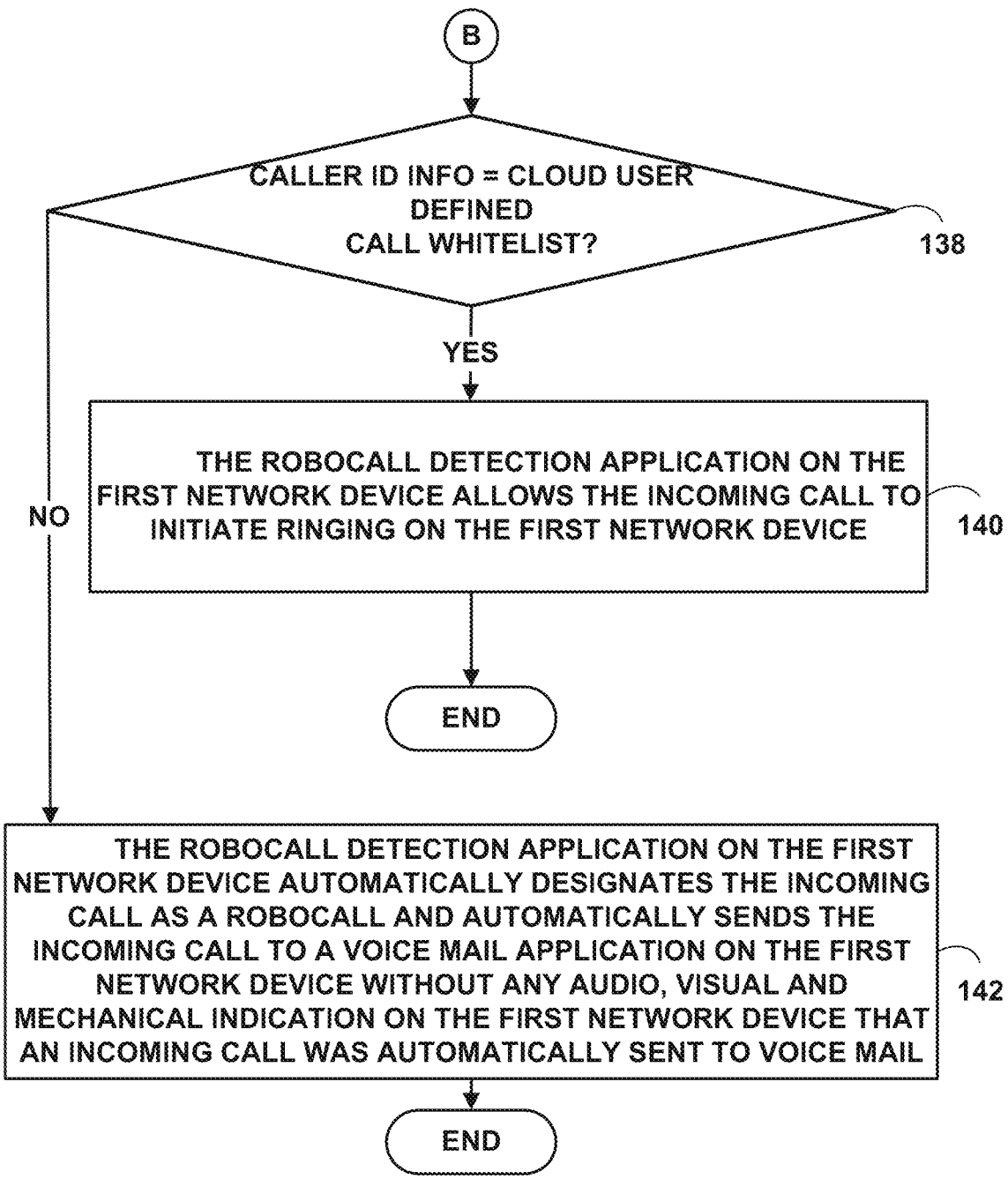

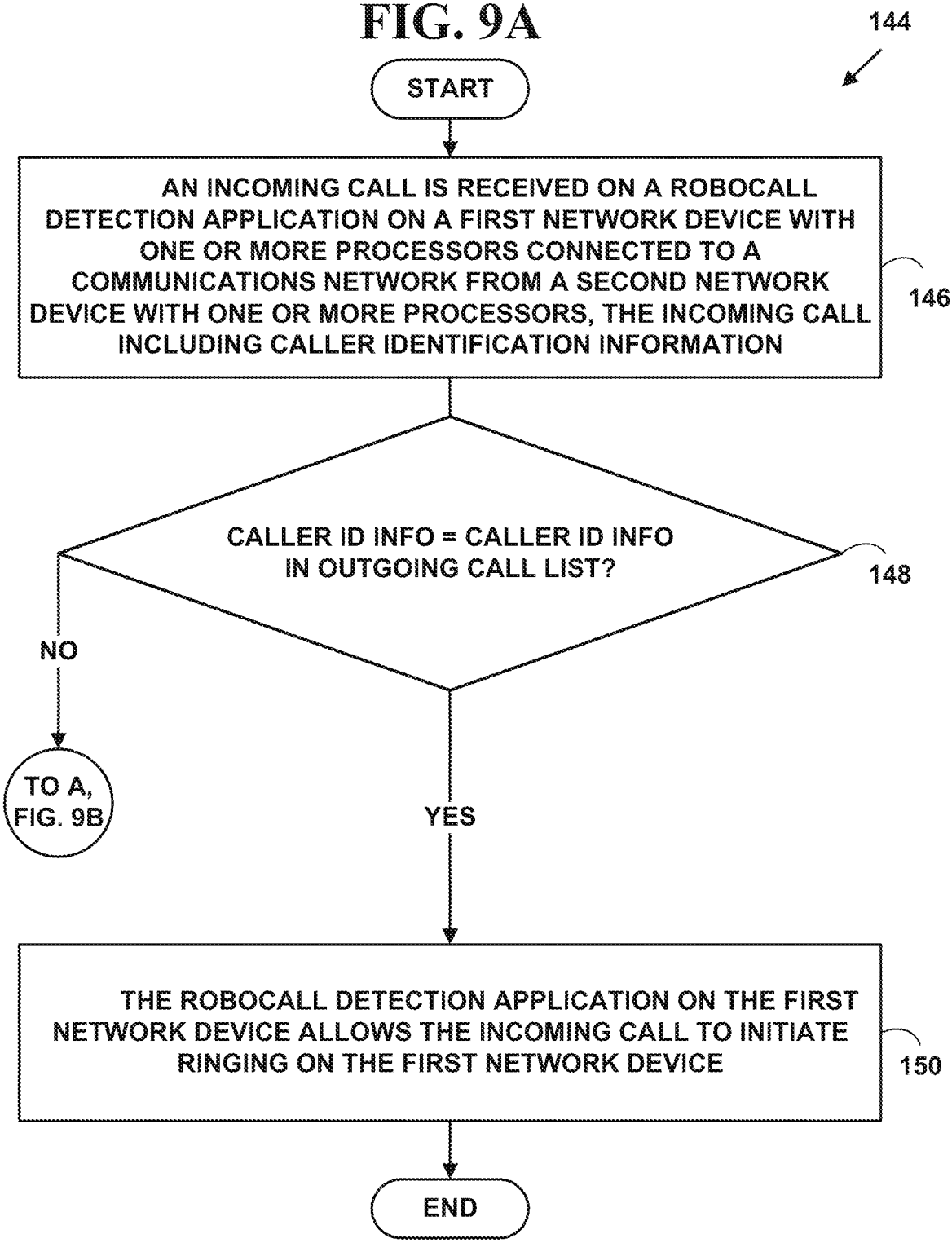

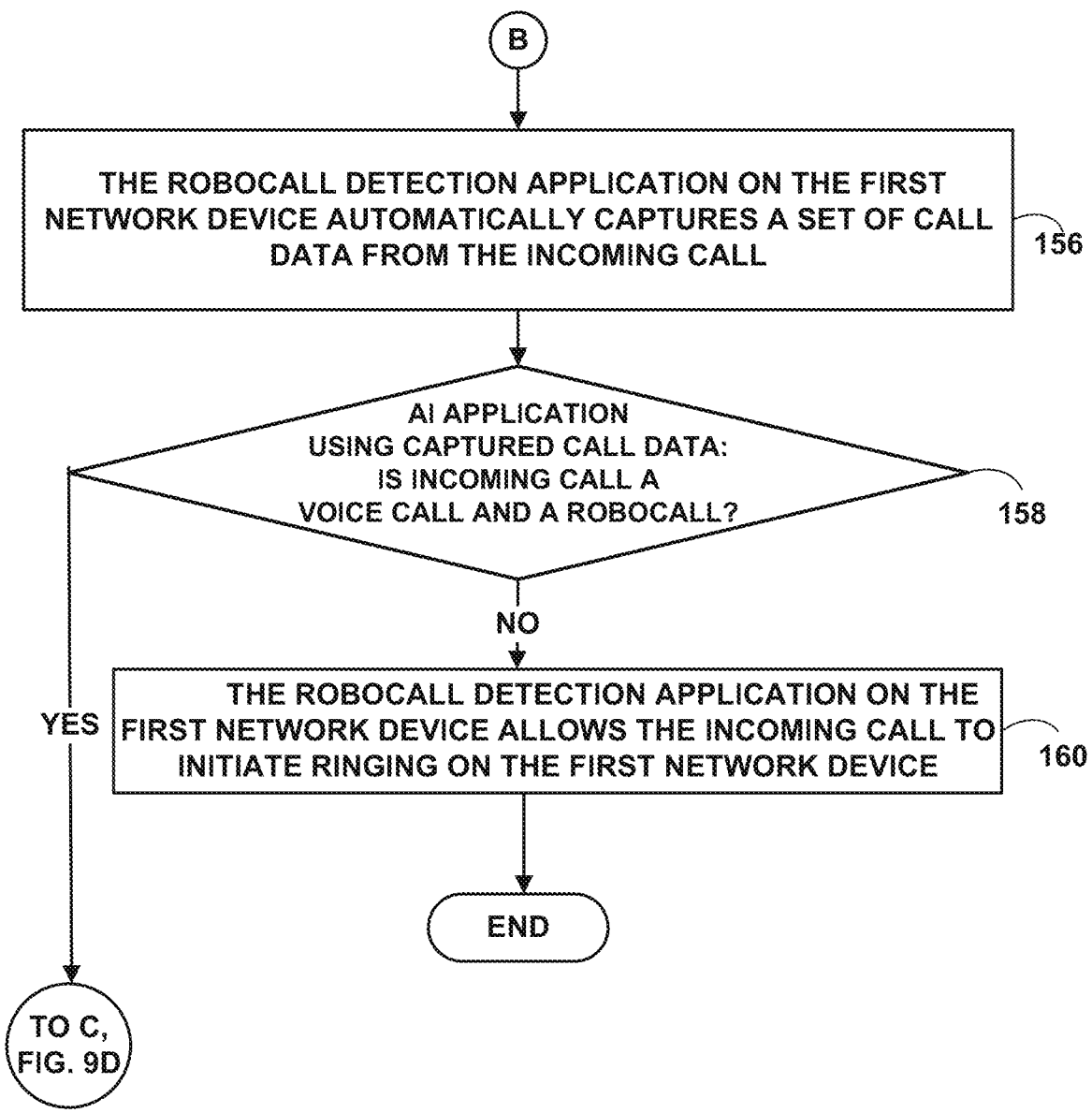

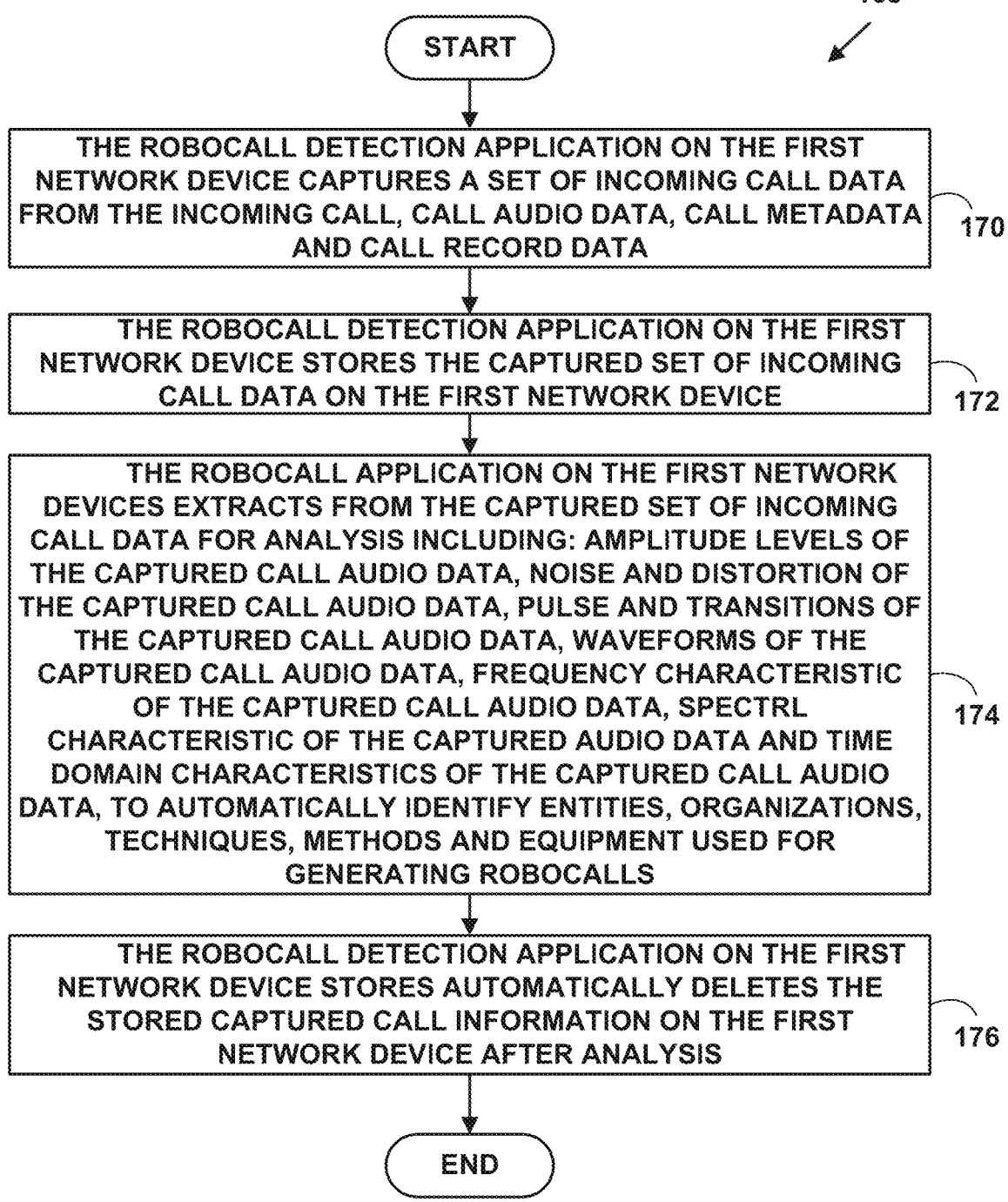

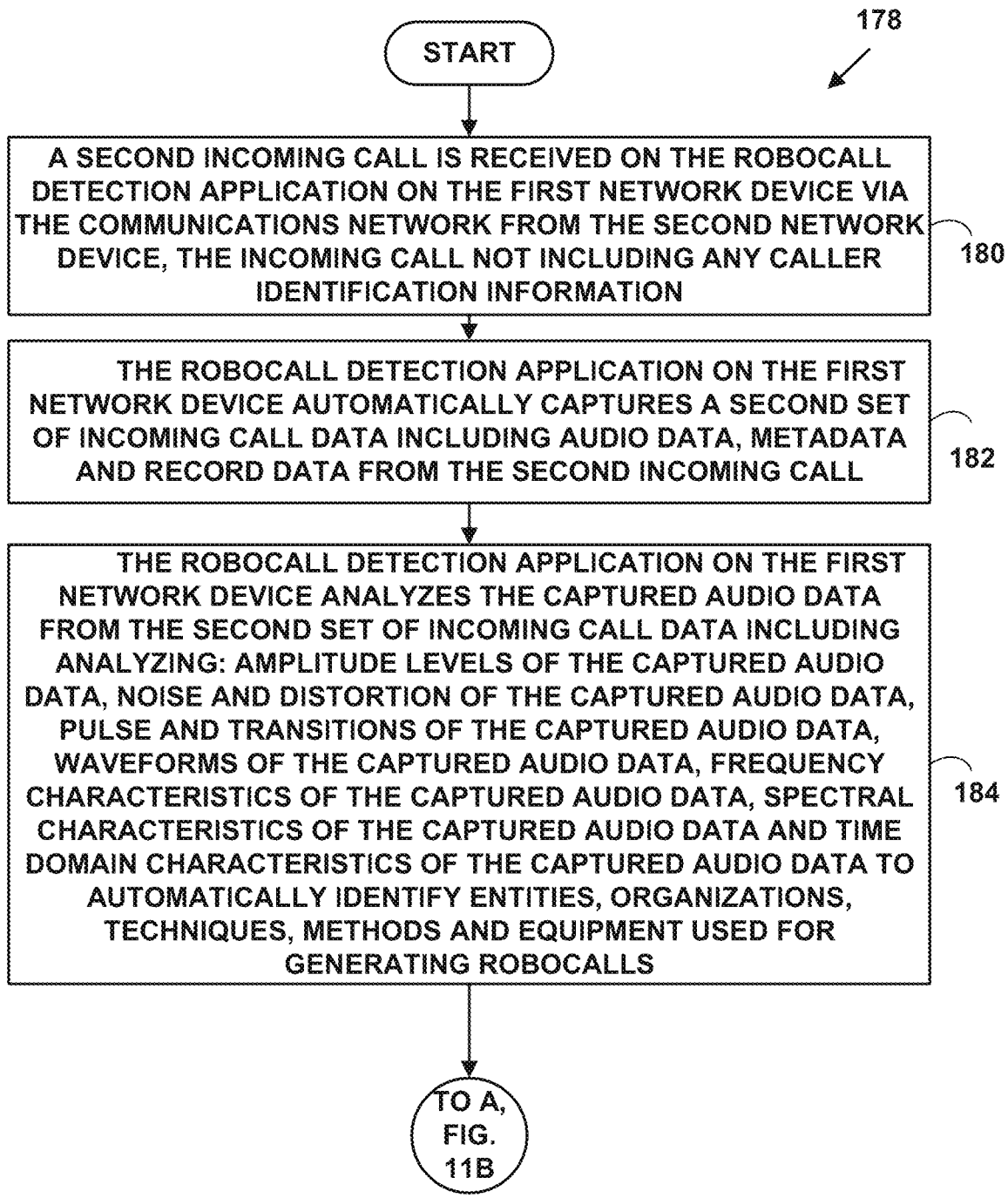

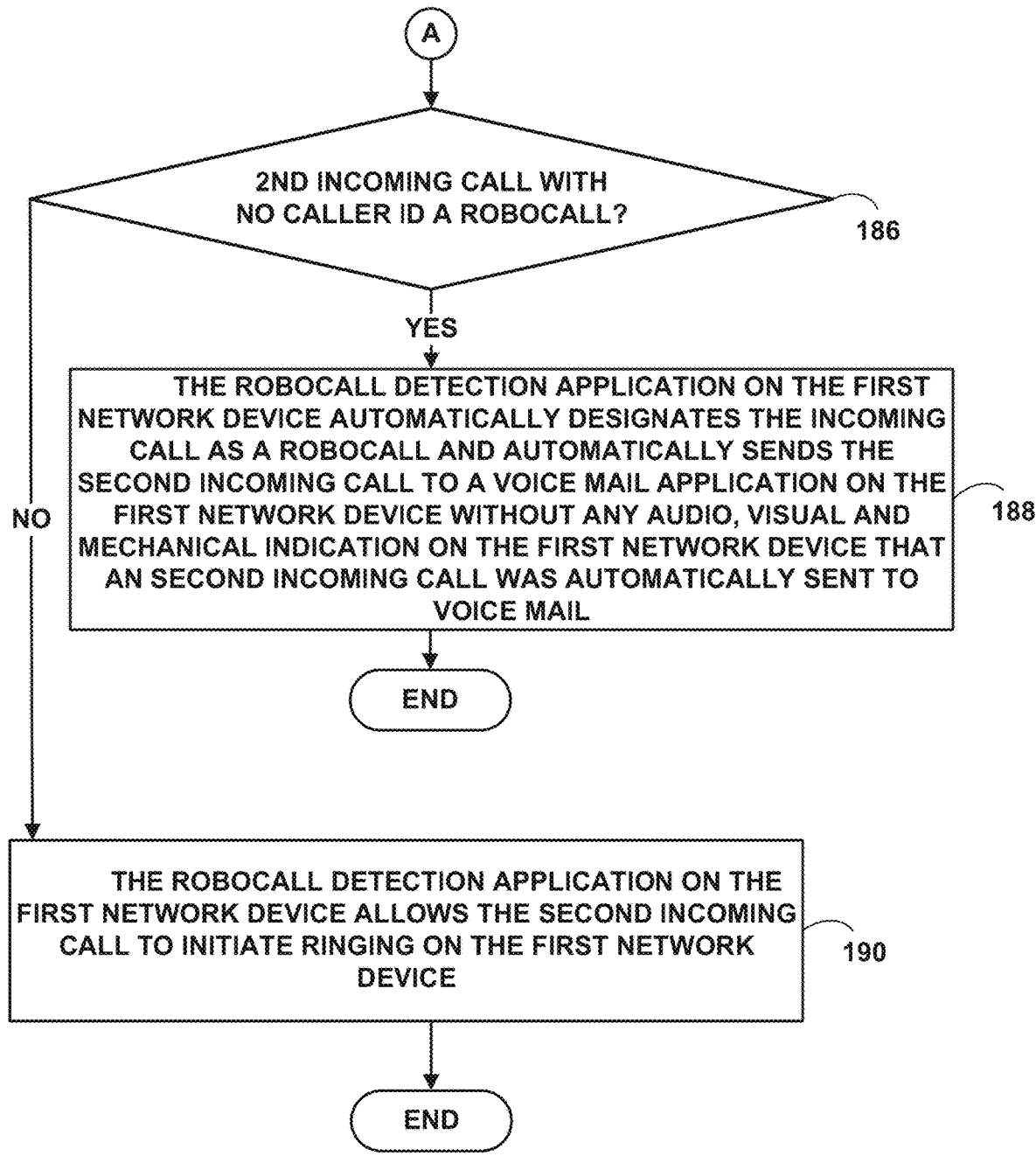

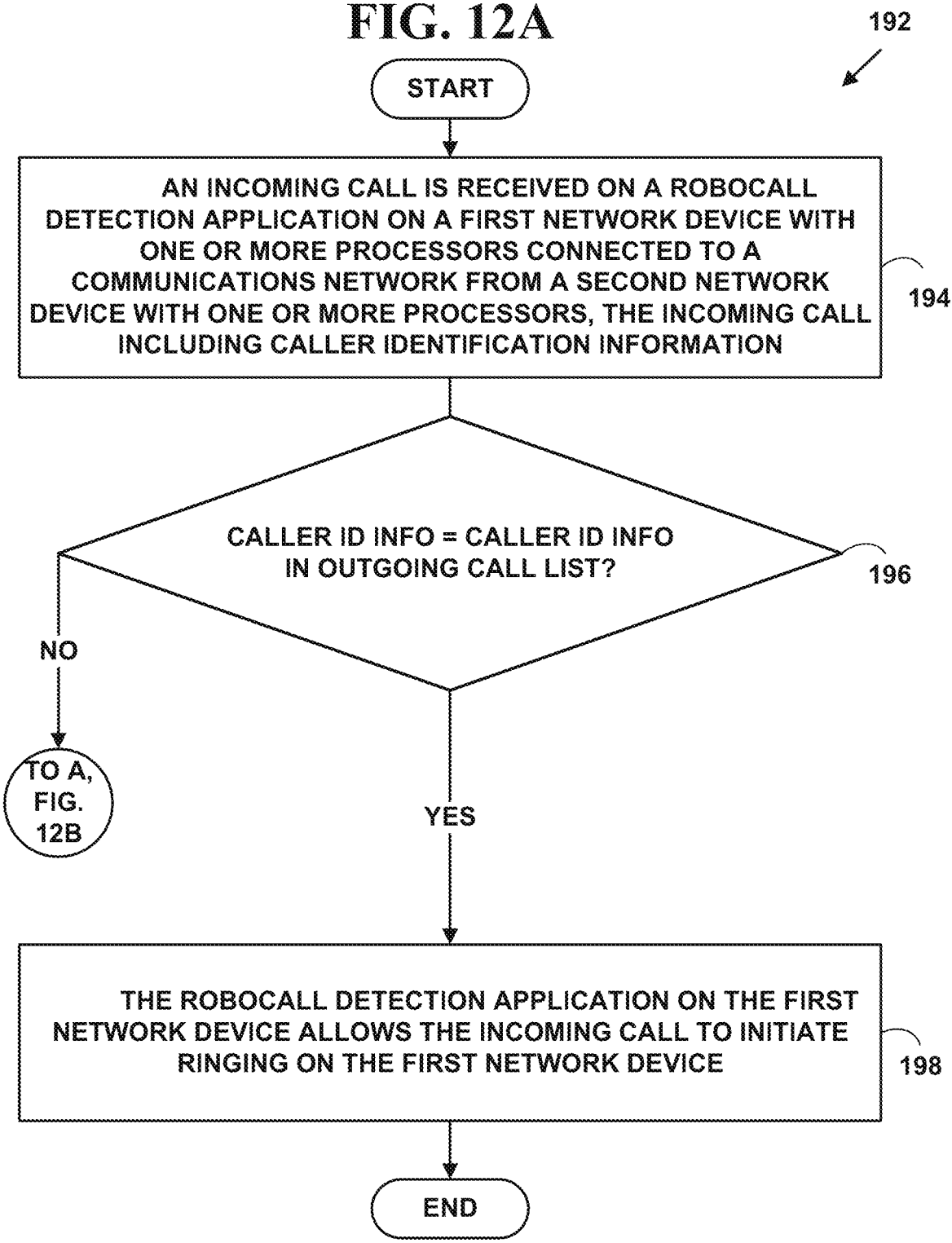

METHOD AND SYSTEM FOR AUTOMATICALLY BLOCKING ROBOCALLS

CROSS REFERENCES TO RELATED APPLICATIONS

This U.S. utility patent application is a Continuation-In-Part (CIP) of U.S. utility patent application number, filed Sep. 24, 2019, which issued into U.S. Pat. No. 10,805,458, on Oct. 13, 2020, the contents of all of which are incorporated herein by reference.

FIELD OF INVENTION

This invention relates to telecommunications. More specifically, it relates to a method and system for blocking robocalls.

BACKGROUND OF THE INVENTION

A "robocall" is a phone call that uses a computerized autodialer to dial a phone number and to deliver a prerecorded message, as if from a robot. Robocalls are often associated with political and telemarketing phone campaigns, but can also be used for public-service or emergency announcements. Some robocalls use personalized audio messages to simulate an actual personal phone call.

If a consumer answers his or her phone and hears a recorded message instead of a live person, it's a robocall. If a consumer is getting many robocalls the robocalls are likely pitching something to the consumer that is unwanted, or unnecessary or are illegal scams generated by criminals that threaten the consumer in some way or ask the consumer for money, bank account, information, etc.

In the United States, the Federal Trade Commission (FTC) has created a National Do Not Call Registry that is designed to stop sales calls from actual companies that follow the law. The Registry is a list that tells telemarketers what numbers not to call. However, the FTC does not and cannot block robocalls. Scammers don't care if you're on the Registry.

One reason people get a lot of unwanted robocalls is because it's easy and cheap for scammers to call people from anywhere in the world. One solution to stop receiving robocalls is to use a call blocking application.

However, one problem with such call blocking applications is that separate applications are required for wireless mobile phones, wired landlines that use Voice over Internet Protocol (VoIP) and traditional wired landlines.

Another problem is that many call blocking applications use call data or reports collected from consumers to attempt to predict which calls are robocalls, are illegal or are likely scams.

Another problem is that many call blocking applications that use prediction methods derived from call data collected from consumers actually block calls altogether, cause a phone to ring silently or go straight to voicemail, thereby blocking legitimate calls the consumer desires to actually receive.

Another problem is that many call blocking applications block calls based on the geographic location or area code of the incoming call. This also leads to blocking legitimate calls the consumer desires to actually receive.

Another problems is that many call blocking applications require a consumer manually create "blacklists" of robocall numbers to block and "whitelists" of numbers to let through. This places a big burden on the consumer and often creates confusion and frustration as to which call numbers might be legitimate and what numbers might be robocalls.

Another problem is that may call blocking applications do not handle "call spoofing." "Call spoofing" is the practice of causing the telephone network to indicate to the receiver of a call that the originator of the call is a station other than the true originating station. For example, a caller ID display might display a phone number different from that of the telephone from which the call was placed. The term is commonly used to describe situations in which the motivation is considered malicious by the originator.

Caller ID spoofing is provided as a service by a number of vendors. For example, a robocall customer pays in advance for a certain number of calling minutes. To set up a robocall, the roboccall customer opens a web form and enters their own phone number, the recipient's phone number, and the spoofed robocall number chosen to appear on the recipient's caller display. The service then patches the call through between the caller and recipient phones replacing the customer's number with the spoofed robocall number. The spoofed robocall number is the number that appears on the recipient's caller ID.

For example, scammers often use these "spoofed" names and numbers that appear on a consumer's call id in government imposter scams to make the consumer think it's the Social Security Administration, Internal Revenue Service (IRS) or law enforcement calling. Then they try to convince the consumer to wire money or pay them with gift cards or via electronic funds transfer from the consumer's bank account, etc.

Another problem is something known as "neighbor spoofing." Robocall scammers display a number with the consumer's area code. The scammers often match the first six digits of a consumer's phone number, so the consumer is more likely to answer the call. Often the faked name and number belong to a real person who has no idea their information is being misused.

Another problem is that robocall scammers use technology to "spoof" your caller ID (e.g., caller ID memory, etc.) on the phone to make the robocall appear as it is coming from a local business or person in which you've previously communicated with.

Another problem is that robocalls often appear as "toll free" calls or 1-800, 1-877, etc. number based calls. Toll-free numbers, in the United States, receive slightly different information than ordinary numbers when they receive a call. They receive additional information about the caller's number through a system called Automated Number Identification, or ANI, since they're responsible for footing the bill for the call for the toll free services and must have reliable call data information to know their bills are correct. Some call blocking apps use a "phone trap line" to detect fraudulent robocalls and caller ID spoofing by looking for discrepancies between a caller ID and ANI information.

There have been a number attempts to provide solutions to blocking unwanted robocalls. For example, US published patent application number US20140192965 that was published by Almeida teaches "A method uses telephone number lists and a telephone exchange server to enable the blocking of illegal robocalls (prerecorded messages) and to enable the legal ones to proceed free of impediment. The method includes steps of providing a server computer; receiving at the server computer a first telephone number of a first telephone monitored by a first recipient; receiving permission from the first recipient to permit sending a telephone call to the first telephone when the telephone call originates from a second telephone number; storing the first telephone number and the second telephone number; intercepting a call to the first telephone number; determining an originating telephone number for a device making the intercepted call; and comparing the originating telephone number to the telephone number list and if the originating telephone number is in the telephone number list, then the server computer enabling the call to ring at the first telephone."

US published patent application number US20150195403 that was published by Goulet teaches "A robocall is prevented from reaching a telephone subscriber, by an automated calling screening system that tests for presence of a human caller on the line, and disconnects calls absent a predetermined response. Audio messages to stymy a robocaller but answerable by a human are used."

U.S. Pat. No. 10,257,349, that issued to Isgar teaches "Disclosed is a telephone call-back device that can provide a means for the recipient of a robocall incoming phone call to take action. The telephone call-back device includes an activation device, a call source utility, and a call-back utility. The activation device is a button or switch that a user can activate when they receive a robocall. Once the activation device is activated, the call source utility identifies a source phone number of the robocall incoming phone call. The call-back utility initiates one or more robo call-back outgoing phone calls to be sent to the source phone number. The call-back utility can be programmed to try to send many robo call-back outgoing phone calls to the source phone number to try to swamp the phone number with robo call-back outgoing phone calls."

U.S. Pat. No. 10,205,699, that issued to Koster teaches "A contact center maintains a pool of calling party telephone numbers ("CPTN") that can be selected for call origination. A new CPTN can be selected based on various criteria in order to avoid, or respond to, a determination that the current CPTN is "tagged" as being a robocall. The triggering of a new CPTN can be initiated based on various factors, including a number of calls made, a time period, a change in call outcomes, direct input, or by querying a database maintaining status information. Upon triggering the selection of a new number, the old calling party number may be placed in a "dead" pool if tagged, or placed in an "aging" pool for where it is not used for a given time. Once aged, the number is placed in an "available for use" pool. Thus, impacts of service provider robocall processing can be mitigated."

U.S. Pat. No. 10,111,102, that issued to Flaks, et al. teaches "A system and method for monitoring telephone calls to detect fraudulent activity and take corrective action is described. The system receives a group of telephone calls having associated call characteristics and analyzes the group of telephone calls to identify and store a first set of distributions of call characteristics that are indicative of normal activity, fraudulent activity, or indeterminate activity. The system receives one or more subsequent telephone calls to be analyzed. The system analyzes the received one or more telephone calls to identify a second set of distributions of call characteristics associated with the received telephone call. The system then compares the second set of distributions of call characteristics to the stored first set of distributions of call characteristics to assess a probability that the one or more received telephone calls represents normal, fraudulent, or indeterminate activity. If the assessed probability of fraudulent activity exceeds a threshold, the system takes appropriate corrective action, such a flagging the fraudulent call or withholding a financial incentive associated with the fraudulent call."

U.S. Pat. No. 8,942,357, that issued to Goulet teaches "A robocall is prevented from reaching a telephone subscriber, by an automated calling screening system that tests for presence of a human caller on the line, and disconnects calls absent a predetermined response indicating presence of a human caller."

However, none of solutions these solve all of the problems associated with blocking unwanted robocalls. Thus, it is desirable to solve some of problems associated with blocking unwanted robocalls more effectively.

SUMMARY OF THE INVENTION

In accordance with preferred embodiments of the present invention, some of the problems associated blocking robocalls are overcome. A method and system for blocking robocalls is presented.

A set of incoming call data is captured from the incoming call. An incoming call is checked with plural different tests to determine if the robocall includes a voice call component. The plural different tests provide additional levels of detection for robocalls. The method and system automatically identify and process robocalls and help prevent call spoofing and neighbor spoofing by robocalls.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 7A, 7B and 7C are a flow diagram illustrating a method for automatically blocking recorded robocalls;

FIGS. 8A, 8B and 8C are a flow diagram illustrating a method for automatically blocking recorded robocalls;

FIGS. 9A, 9B, 9C and 9D are a flow diagram illustrating a method for automatically blocking robocalls;

FIG. 10 is a flow diagram illustrating a method for automatically blocking robocalls;

FIGS. 11A and 11B are a flow diagram illustrating a method for automatically blocking robocalls; and FIGS. 12A, 12B, 12C and 12D are a flow diagram illustrating a method for automatically blocking robocalls.

DETAILED DESCRIPTION OF THE INVENTION

Exemplary Electronic Call Processing and Display System

Figure 1:
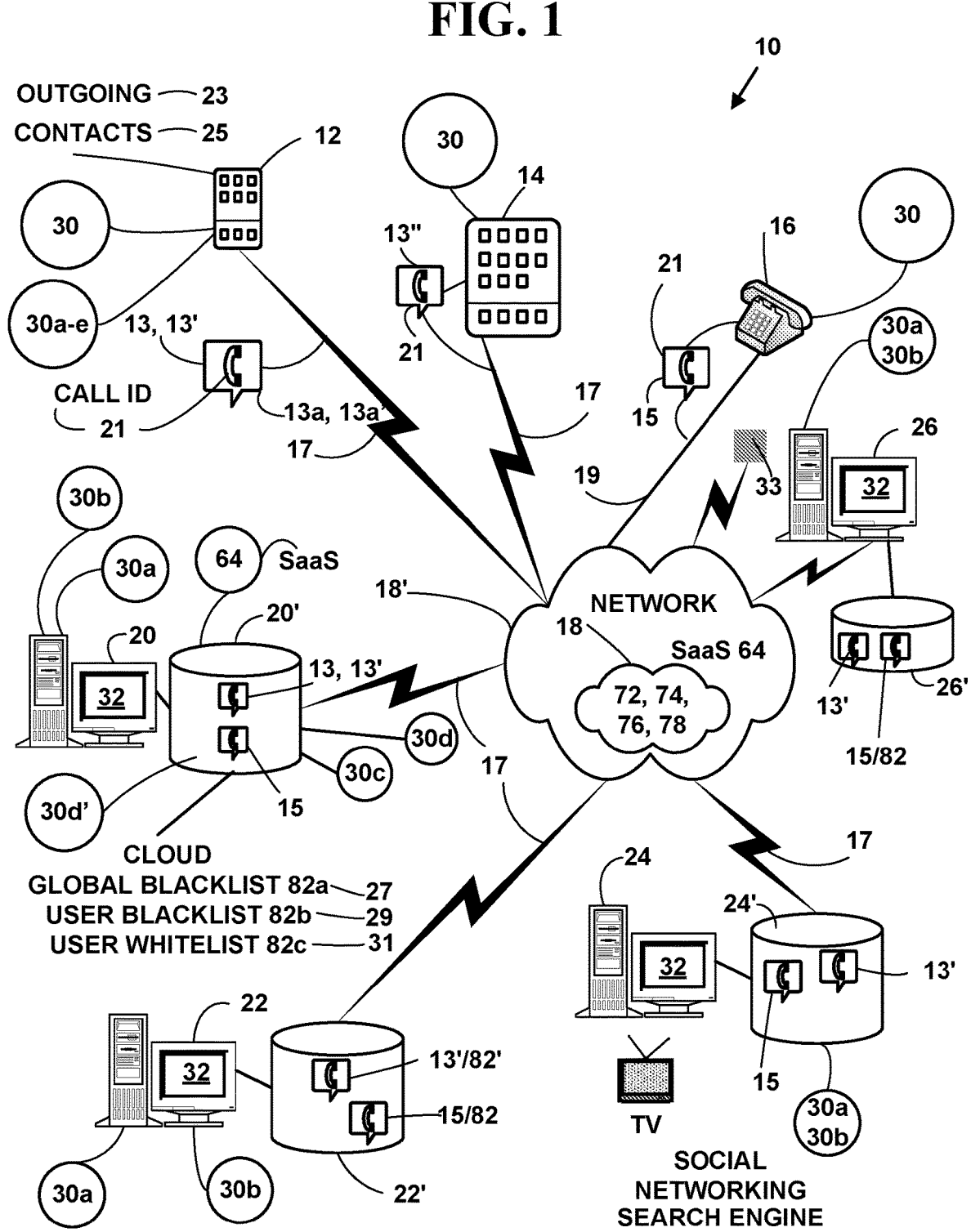
FIG. 1 is a block diagram illustrating an exemplary call processing and display system.

FIG. 1 is a block diagram illustrating an exemplary electronic call processing system 10 for blocking unwanted. The exemplary electronic system 10 includes, but is not limited to, one or more target network devices 12, 14, 16, etc. each with one or more processors and each with a non-transitory computer readable medium.

The one or more target network devices 12, 14, 16 (illustrated in FIG. 1 only as a tablet and two smart phones for simplicity) include, but are not limited to, desktop and laptop computers, tablet computers, mobile phones, non-mobile phones with displays, robots, smart phones, Internet phones, Internet appliances, personal digital/data assistants (PDA), portable, handheld and desktop video game devices, Internet of Things (IoT) devices, cable television (CATV), satellite television (SATV) and Internet television set-top boxes, digital televisions including high definition television (HDTV), three-dimensional (3DTV) televisions, wearable network devices 106-112 (FIG. 6), smart speakers 33 and/or other types of network devices.

A "smart phone" is a mobile phone 12 that offers more advanced computing ability and connectivity than a contemporary basic feature phone. Smart phones and feature phones may be thought of as handheld computers integrated with a mobile telephone, but while most feature phones are able to run applications based on platforms such as JAVA ME, a smart phone usually allows the user to install and run more advanced applications. Smart phones and/or tablet computers run complete operating system software providing a platform for application developers.

The tablet computers 14 include, but are not limited to, tablet computers such as the IPAD, by APPLE, Inc., the HP Tablet, by HEWLETT PACKARD, Inc., the PLAYBOOK, by RIM, Inc., the TABLET, by SONY, Inc., etc.

A "smart speaker" 33 is a type of wireless speaker and voice command device with an integrated virtual assistant that offers interactive actions and hands-free activation with the help of one "hot word" (or several "hot words"). Some smart speakers can also act as a smart device that utilizes Wi-Fi, Bluetooth and other wireless protocol standards to extend usage beyond audio playback, such as to control home automation devices. This can include, but is not be limited to, features such as compatibility across a number of services and platforms, peer-to-peer connection through mesh networking, virtual assistants, and others. Each can have its own designated interface and features in-house, usually launched or controlled via application or home automation software. Some smart speakers also include a screen to show the user a visual response.

The IoT network devices, include but are not limited to, security cameras, doorbells with real-time video cameras, baby monitors, televisions, set-top boxes, lighting, heating (e.g., smart thermostats, etc.), ventilation, air conditioning (HVAC) systems, and appliances such as washers, dryers, robotic vacuums, air purifiers, ovens, refrigerators, freezers, toys, game platform controllers, game platform attachments (e.g., guns, googles, sports equipment, etc.), and/or other IoT network devices.

The target network devices 12, 14, 16 are in communications with a cloud communications network 18 or a non-cloud computing network 18' via one or more wired and/or wireless communications interfaces. The cloud communications network 18, is also called a "cloud computing network" herein and the terms may be used interchangeably.

The plural target network devices 12, 14, 16 receive wireless 17 and/or wired 19 calls 13, 15 for via the cloud communications network 18 or non-cloud communications network 18'.

The cloud communications network 18 and non-cloud communications network 18' includes, but is not limited to, communications over a wire 19 connected to the target network devices, wireless 17 communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16, 33, 98-104 via the cloud communications network 18 and non-cloud communications network 18'.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, 22, 24, 26, etc.) store portions 13', 15' of the telephone calls 13, 15 as cloud storage objects 82 (FIG. 5) as is described herein.

The plural server network devices 20, 22, 24 26, may be connected to, but are not limited to, telecommunications servers World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 and non-cloud communications network 18' includes, but is not limited to, a wired 19 and/or wireless 17 communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired 19 and/or wireless 17 communications networks 18.

The cloud communications network 18 and non-cloud communications network 18' includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Electronic Content Display System

Figure 2:
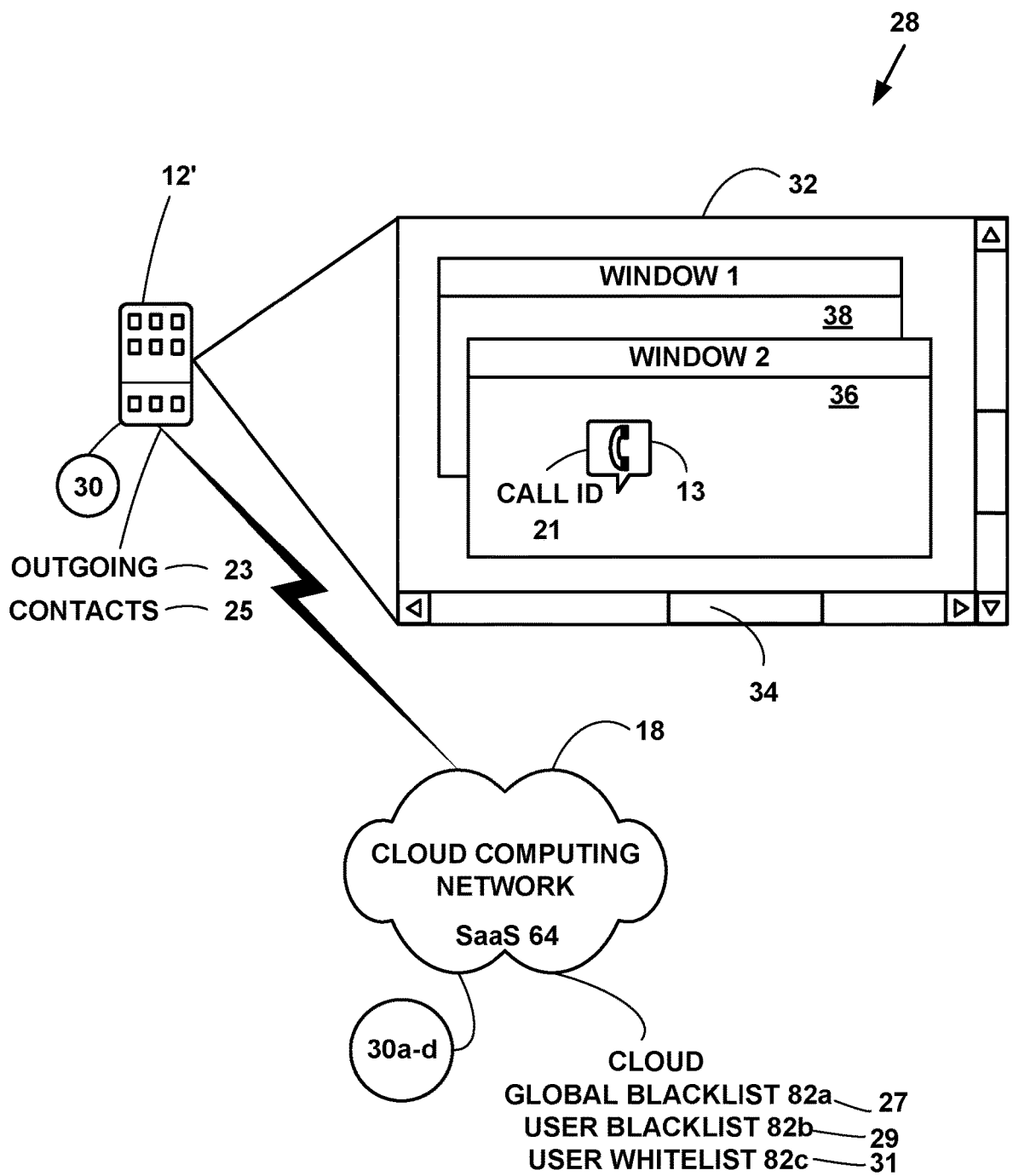
FIG. 2 is a block diagram illustrating an exemplary electronic message display system.

FIG. 2 is a block diagram illustrating an exemplary electronic message information display system 28. The exemplary electronic message information display system 12' includes, but is not limited to a target network device (e.g., 12, etc.) with an application 30 and a display component 32. The application 30 presents a graphical user interface (GUI) 34 on the display 32 component. The GUI 32 presents a multi-window 36, 38, etc. (only two of which are illustrated) interface to a user. In one embodiment, the display component 32 displays caller ID information for a telephone call.

In one embodiment of the invention, the application 30 is a software application. However, the present invention is not limited to this embodiment and the application 30 can be hardware, firmware, hardware and/or any combination thereof. In one embodiment, the application 30 includes a mobile application for a smart phone, electronic tablet and/or other network device. In one embodiment, the application 30 includes web-browser based application. In one embodiment, the application 30 includes a web-chat client application. In another embodiment, the application 30a, 30b, 30c, 30d, 30e includes a cloud application used on a cloud communications network 18. In one embodiment, the application 30a, 30b, 30c, 30d, 30e includes a thin client application and/or thin client cloud application in communications with one or more server network devices and/or cloud server network devices. However, the present invention is not limited these embodiments and other embodiments can be used to practice the invention In another embodiment, a portion of the application 30 is executing on the target network devices 12, 14, 16, 33, 98-104 and another portion of the application 30a, 30b, 30c, 30d, 30d is executing on the server network devices 20, 22, 24, 26. The applications also include one or more library applications. However, the present invention is not limited these embodiments and other embodiments can be used to practice the invention.

Exemplary Networking Protocol Stack

Figure 3:
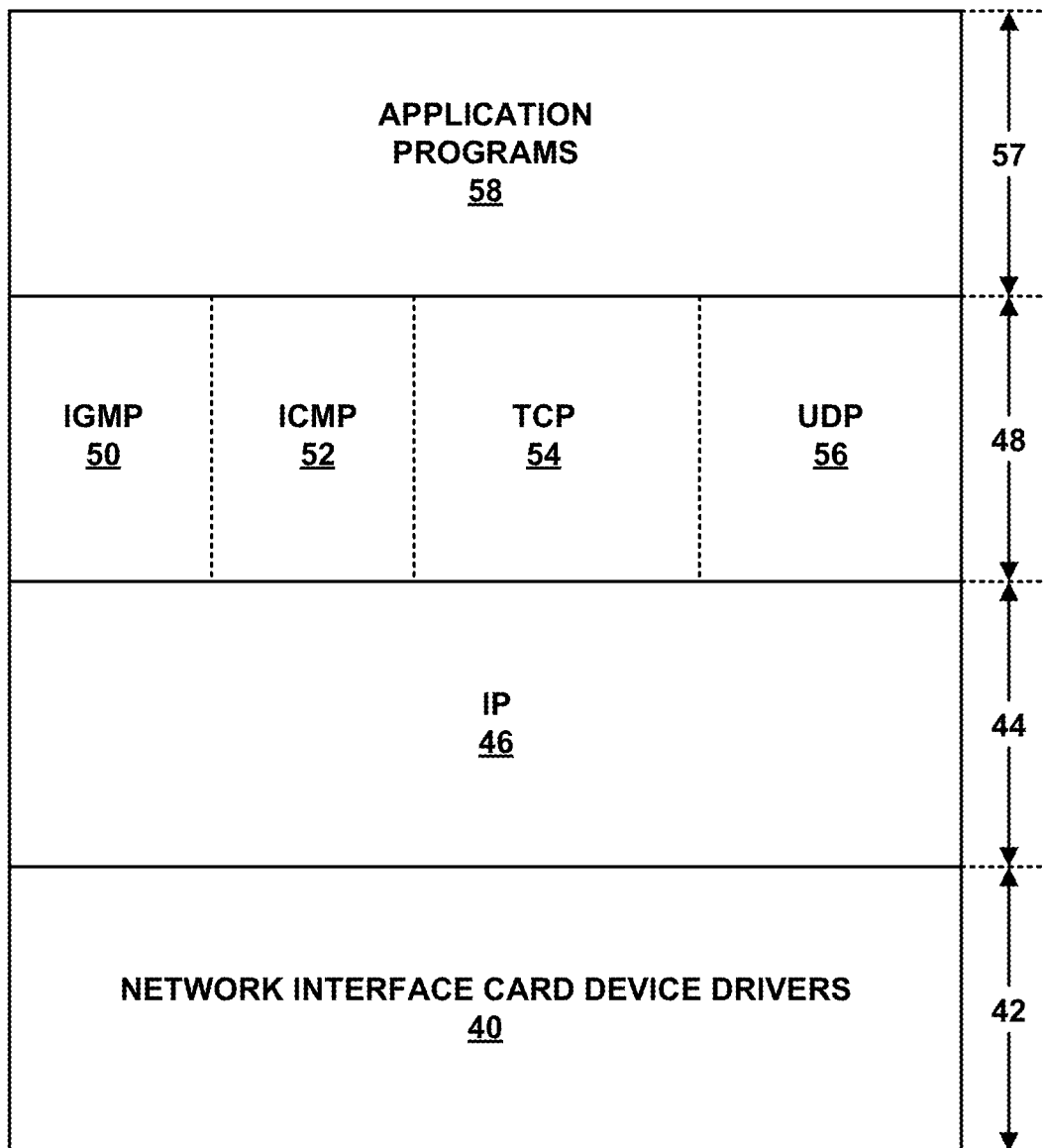
FIG. 3 is a block diagram illustrating an exemplary networking protocol stack.

FIG. 3 a block diagram illustrating a layered protocol stack 38 for network devices in the electronic message information display system 10. The layered protocol stack 38 is described with respect to Internet Protocol (IP) suites comprising in general from lowest-to-highest, a link 42, network 44, transport 48 and application 56 layers. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The network devices 12, 14, 16, 20, 22, 24, 26, 33, 98-104 are connected to the communication network 18 with Network Interface Card (NIC) cards including device drivers 40 in a link layer 42 for the actual hardware connecting the network devices 12, 14, 16, 20, 22, 24, 26, 33, 98-104 to the cloud communications network 18. For example, the NIC device drivers 40 may include a serial port device driver, a digital subscriber line (DSL) device driver, an Ethernet device driver, a wireless 18 device driver, a wired 19 device driver, etc. The device drivers interface with the actual hardware being used to connect the network devices to the cloud communications network 18. The NIC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30*a*, 30*b*, 30*c*, 30*d*, 30*e*, etc.) to carry out desired functionality for a network device reside. For example, the application programs 58 for the client network devices 12, 14, 16, 33, 98-104 may include web-browsers or other application programs, application program 30, while application programs for the server network devices 20, 22, 24, 26 may include other application programs (e.g., 30*a*, 30*b*, 30*c*, 30*d*, 30*e*, etc.).

In one embodiment, application program 30 includes, but is not limited to, a robocall blocking, application 30*a*, a cloud SaaS 64 application 30*b*, an Artificial Intelligence (AI) application 30*c* and/or other application 30*d* such as a Big Data application and/or a voice mail application 30*e*. However, the present invention is not limited to such an embodiment and more, fewer and/or other applications can be used to practice the invention.

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

In addition, markup languages such as HyperText Markup Language (HTML), EXtensible Markup Language (XML) and others are used.

HyperText Markup Language (HTML) is a markup language for creating web pages and other information that can be displayed in a web browser.

HTML is written in the form of HTML elements consisting of tags enclosed in angle brackets within the web page content. HTML tags most commonly come in pairs although some tags represent empty elements and so are unpaired. The first tag in a pair is the start tag, and the second tag is the end tag (they are also called opening tags and closing tags). In between these tags web designers can add text, further tags, comments and other types of text-based content.

The purpose of a web browser is to read HTML documents and compose them into visible or audible web pages. The browser does not display the HTML tags, but uses the tags to interpret the content of the page.

HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages.

EXtensible Markup Language (XML) is another markup language that defines a set of rules for encoding documents in a format that is both human-readable and machine-readable. It is defined in the XML 1.0 Specification produced by the W3C, the contents of which are incorporated by reference and several other related specifications, all free open standards.

XML a textual data format with strong support via Unicode for the languages of the world. Although the design of XML focuses on documents, it is widely used for the representation of arbitrary data structures, for example in web services. The oldest schema language for XML is the Document Type Definition (DTD). DTDs within XML documents define entities, which are arbitrary fragments of text and/or markup tags that the XML processor inserts in the DTD itself and in the XML document wherever they are referenced, like character escapes.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Wireless Interfaces

In one embodiment of the present invention, the wireless interfaces on network devices 12, 14, 16, 20, 22, 24, 26, 33, 98-104 include but are not limited to, IEEE 802.11a, 802.11b, 802.11g, 802.11n, 802.15.4 (ZigBee), "Wireless Fidelity" (Wi-Fi), Wi-Fi Aware, "Worldwide Interoperability for Microwave Access" (WiMAX), ETSI High Performance Radio Metropolitan Area Network (HIPERMAN) or "RF Home," cellular telephone and/or satellite, wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a.

Wi-Fi Aware is a new capability for energy-efficient, proximity-based service discovery among Wi-Fi capable devices. The technology in Wi-Fi Aware enables network devices to discover other devices such network devices, applications, and information nearby before making a Wi-Fi connection. Wi-Fi Aware makes contextual awareness more immediate and useful, enabling personalized applications that continuously scan surroundings, anticipate actions, and notify of services and selected preferences.

Cellular telephone technology uses radio waves over a networked area called cells and is served through a cell site or base station at a fixed location, enabling calls to be made and data to transmitted wirelessly over a wide range.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, a full handshake protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WLP.

The satellite communications include, but is not limited to, wireless and/or wired terrestrial methods of communication and Earth-to-satellite, satellite-to-satellite communications, Earth-to-planetary object (e.g. satellite, space station, etc.), or interconnected or networked systems of satellites and/or stations.

The satellites satellite communications further include satellites in "low earth orbit" (LEO) and "high earth orbit" (HEO). LEO satellites operate at an altitude of about 2,000 kilometers (about 1,243 miles) or less. A low earth orbit is an earth-centered orbit that extends to an altitude of between 160 kilometers (about 99 miles) and 2,000 kilometers from the earth. LEO satellites move quickly with an orbital period (i.e., the time to complete one orbit of the earth) of 128 minutes or less (about 11.25 periods per day), and an orbital eccentricity (i.e., how much the Kepler orbit deviates from a perfect circle) of 0.25 or less, defined as an elliptical orbit. Most HEO satellites orbit the earth at an altitude greater than about 22,223 miles (about 36,000 kilometers) and their orbital period is the same as Earth's rotational period: 24 hours. Included in this category are geostationary (GSO) satellites, which remain in orbit above a fixed spot on Earth.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without buses can also be used to practice the invention.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18 or non-cloud communications network 18'.

The one or more target network devices 12, 14, 16, 20, 22, 24, 26, 33, 98-104 and one or more server network devices 20, 22, 24, 26 communicate with each other and other network devices with near field communications (NFC) and/or machine-to-machine (M2M) communications.

"Near field communication (NFC)" is a set of standards for smartphones and similar network devices to establish radio communication with each other by touching them together or bringing them into close proximity, usually no more than a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags 99 and/or sensor.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

An "RFID tag" is an object that can be applied to or incorporated into a product, animal, or person for the purpose of identification and/or tracking using RF signals.

An "RFID sensor" is a device that measures a physical quantity and converts it into an RF signal which can be read by an observer or by an instrument (e.g., target network devices 12, 14, 16, 20, 22, 24, 26, 33, 98-104, server network devices 20, 22, 24, 26, etc.)

"Machine to machine (M2M)" refers to technologies that allow both wireless 17 and wired 17 systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

However, the present invention is not limited to such wireless interfaces and wireless networks and more, fewer and/or other wireless interfaces can be used to practice the invention.

Wired Interfaces

In one embodiment of the present invention, the wired 19 interfaces include wired interfaces and corresponding networking protocols for wired 19 connections to the Public Switched Telephone Network (PSTN) and/or a cable television network (CATV) and/or satellite television networks (SATV) and/or three-dimensional television (3DTV), including HDTV, and/or Ethernet networks, that connect the network devices 12, 14, 16, 20, 22, 24, 26, 33, 98-104 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications 30a, 30b, 30c, 30d, 30e provide cloud SaaS 64 services and/or non-cloud application 30 services from television services over the cloud communications network 18 or application services over the non-cloud communications network 18'. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications 30a, 30b, 30c, 30d, 30e provide cloud SaaS 64 services and/or non-cloud application 30 services from Internet television services over the cloud communications network 18 or non-cloud communications network 18' The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other network device.

"Web-TV" delivers digital content via broadband and mobile networks. The digital content is streamed to a viewer's set-top box, game console, computer, or other network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications 30a, 30b, 30c, 30d, 30e provide cloud SaaS 64 services and/or non-cloud application 30 services from general search engine services. A search engine is designed to search for information on a cloud communications network 18 or non-cloud communications network 18' such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30a, 30b, 30c, 30d, 30e provide cloud SaaS 64 services and/or non-cloud application services 30 from general search engine services. In another embodiment, the cloud applications 30, 30a, 30b, 30c, 30d, 30e provide general search engine services by interacting with one or more other public search engines (e.g., GOOGLE, BING, YAHOO, etc.) and/or private search engine services.

In another embodiment, the cloud applications 30a, 30b, 30c, 30d, 30e provide cloud SaaS 64 services and/or non-cloud application 30 services from specialized search engine services, such as vertical search engine services by interacting with one or more other public vertical search engines (e.g., GALAXY.COM, etc.) and/or private search engine services.

However, the present invention is not limited to such general and/or vertical search engine services and more, fewer and/or other general search engine services can be used to practice the invention.

Social Networking Services

In one embodiment, the cloud applications 30a, 30b, 30c, 30d, 30e provide cloud SaaS 64 services and/or non-cloud application 30 services from one more social networking services including to/from one or more social networking web-sites (e.g., FACEBOOK, YOUTUBE, TWITTER, INSTAGRAM, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26, 33, 98-104 with wired 19 and/or wireless 17 interfaces of the present invention include one or more of the security and encryptions techniques discussed herein for secure communications on the cloud communications network 18 or non-cloud communications network 18'.

Application programs 58 (FIG. 2) include security and/or encryption application programs integral to and/or separate from the applications 30, 30a, 30b, 30c, 30d, 30e. Security and/or encryption programs may also exist in hardware components on the network devices (12, 14, 16, 20, 22, 24, 26, 33, 98-104) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i standard is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security methods are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
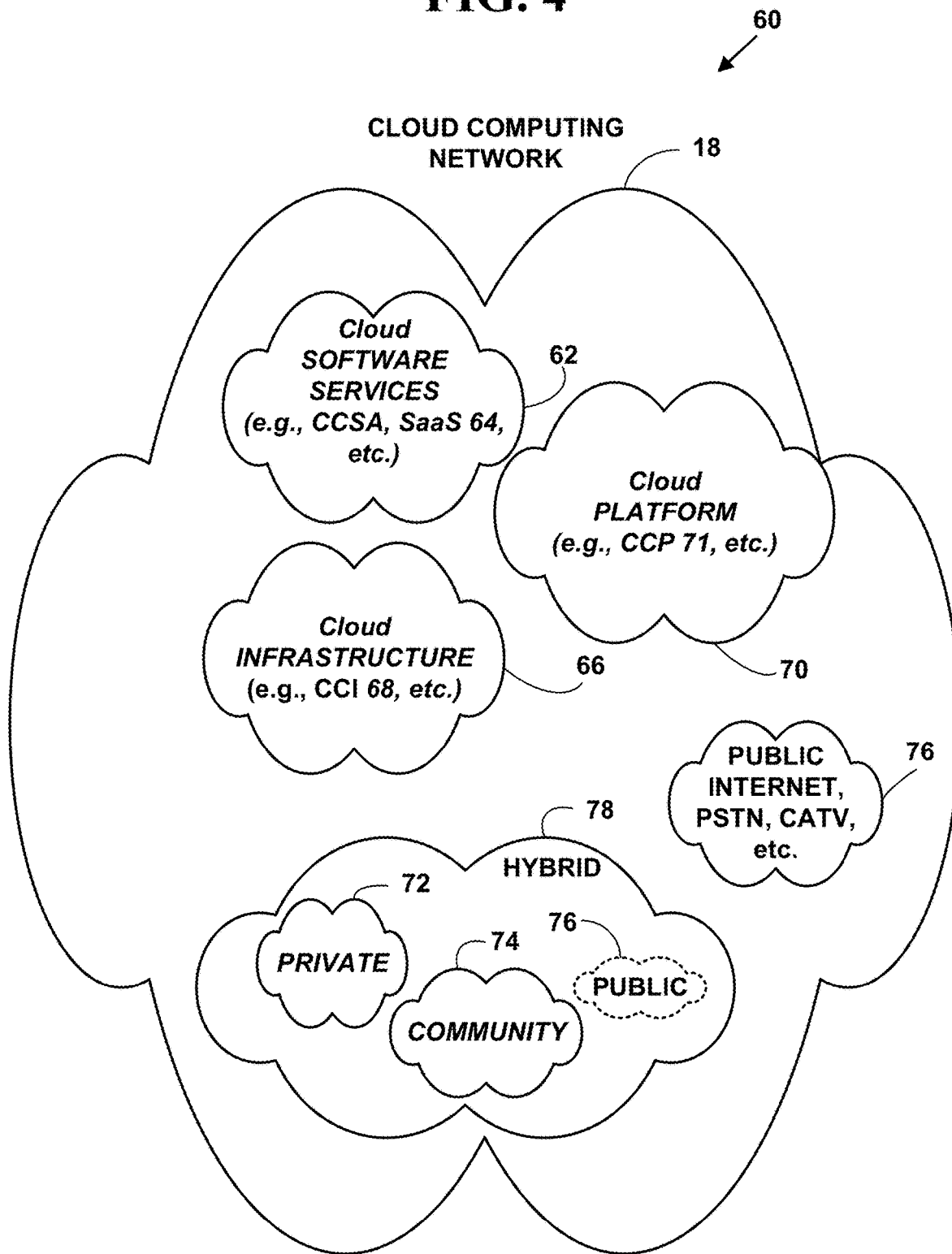
FIG. 4 is block diagram illustrating an exemplary cloud communications network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network 18 includes both wired 19 and/or wireless 17 components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand robocall blocking services. Automatic robocall blocking services can unilaterally provision computing capabilities, such as server time and network storage, as needed automatically without requiring human interaction with each network server on the cloud communications network 18.
2. Broadband network access. Automatic robocall blocking services capabilities are available over plural broadband communications networks and accessed through standard mechanisms that promote use by heterogeneous thin or thick client platforms (e.g., mobile phones, smartphones 14, tablet computers 12, laptops, PDAs, etc.). The broadband network access includes high speed network access such as 3G, 4G and 5G wireless 17 and/or wired 19 and broadband and/or ultra-broadband (e.g., WiMAX, etc.) network access.

TABLE 1-continued

3. Resource pooling. Automatic robocall blocking services resources are pooled to serve multiple requesters using a multi-tenant model, with different physical and virtual resources dynamically assigned and reassigned according to demand. There is location independence in that a requester of services has no control and/or knowledge over the exact location of the provided by the robocall blocking service resources but may be able to specify location at a higher level of abstraction (e.g., country, state, or data center). Examples of pooled resources include storage, processing, memory, network bandwidth, virtual server network device and virtual target network devices. Cloud compute resources are turned automatically by the identification and exploitation of robocall features, allowing for more efficient usage of cloud computing resources.
4. Rapid elasticity. Capabilities can be rapidly and elastically provisioned, in some cases automatically, to quickly scale out and rapidly released to quickly scale for robocall blocking service collaboration. For automatic robocall blocking service services, multi-media collaboration converters, the automatic robocall blocking services collaboration and analytic conversion capabilities available for provisioning appear to be unlimited and can be used in any quantity at any time.
5. Measured Services. Cloud computing systems automatically control and optimize resource use by leveraging a metering capability at some level of abstraction appropriate to the type of automatic robocall blocking services (e.g., storage, processing, bandwidth, custom electronic content retrieval applications, etc.). Electronic Automatic robocall blocking services collaboration conversion usage is monitored, controlled, and reported providing transparency for both the automatic robocall blocking services provider and the automatic robocall blocking service requester of the utilized electronic content storage retrieval service.

Exemplary cloud computing service models illustrated in FIG. 4 appear in Table 2. However, the present invention is not limited to these service models and more, fewer or other service models can also be used to practice the invention.

TABLE 2

1. Cloud Computing Software Applications 62 for robocall blocking services (CCSA, SaaS 64). The capability to use the provider's applications 30, 30a, 30b, 30c, 30d, 30e running on a cloud infrastructure 66. The cloud computing applications 62, are accessible from the server network device 20 from various client devices 12, 14, 16 through a thin client interface such as a web browser, etc. The user does not manage or control the underlying cloud infrastructure 66 including network, servers, operating systems, storage, or even individual application 30, 30a, 30b, 30c, 30d, 30e capabilities, with the possible exception of limited user-specific application configuration settings.
2. Cloud Computing Infrastructure 66 for robocall blocking services (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30a, 30b, 30c, 30d, 30e. The user does not manage or control the underlying cloud infrastructure 66 but has control over operating systems, storage, deployed applications, and possibly limited control of select networking components (e.g., host firewalls, etc.).
3. Cloud Computing Platform 70 for robocall blocking services (CCP 71). The capability provided to the user to deploy onto the cloud infrastructure 66 created or acquired applications created using programming languages and tools supported servers 20, 22, 24, 26, etc.. The user not manage or control the underlying cloud infrastructure 66 including network, servers, operating systems, or storage, but has control over the deployed applications 30a, 30b, 30c, 30d, 30e and possibly application hosting environment configurations.

Exemplary cloud computing deployment models appear in Table 3. However, the present invention is not limited to these deployment models and more, fewer or other deployment models can also be used to practice the invention.

TABLE 3

1. Private cloud network 72. The cloud network infrastructure is operated solely for robocall blocking services. It may be managed by the electronic content retrieval or a third party and may exist on premise or off premise.
2. Community cloud network 74. The cloud network infrastructure is shared by several different organizations and supports a specific electronic content storage and retrieval community that has shared concerns (e.g., mission, security requirements, policy, compliance considerations, etc.). It may be managed by the different organizations or a third party and may exist on premise or off premise.
3. Public cloud network 76. The cloud network infrastructure such as the Internet, PSTN, SATV, CATV, Internet TV, etc. is made available to the general public or a large industry group and is owned by one or more organizations selling cloud services.
4. Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for robocall blocking services takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30, 30a, 30b, 30c, 30d, 30e offers cloud services for automatic robocall blocking services. The application 30, 30a, 30b, 30c, 30d, 30e offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 64 (SaaS) including a specific cloud software service 64 for automatic robocall blocking services. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
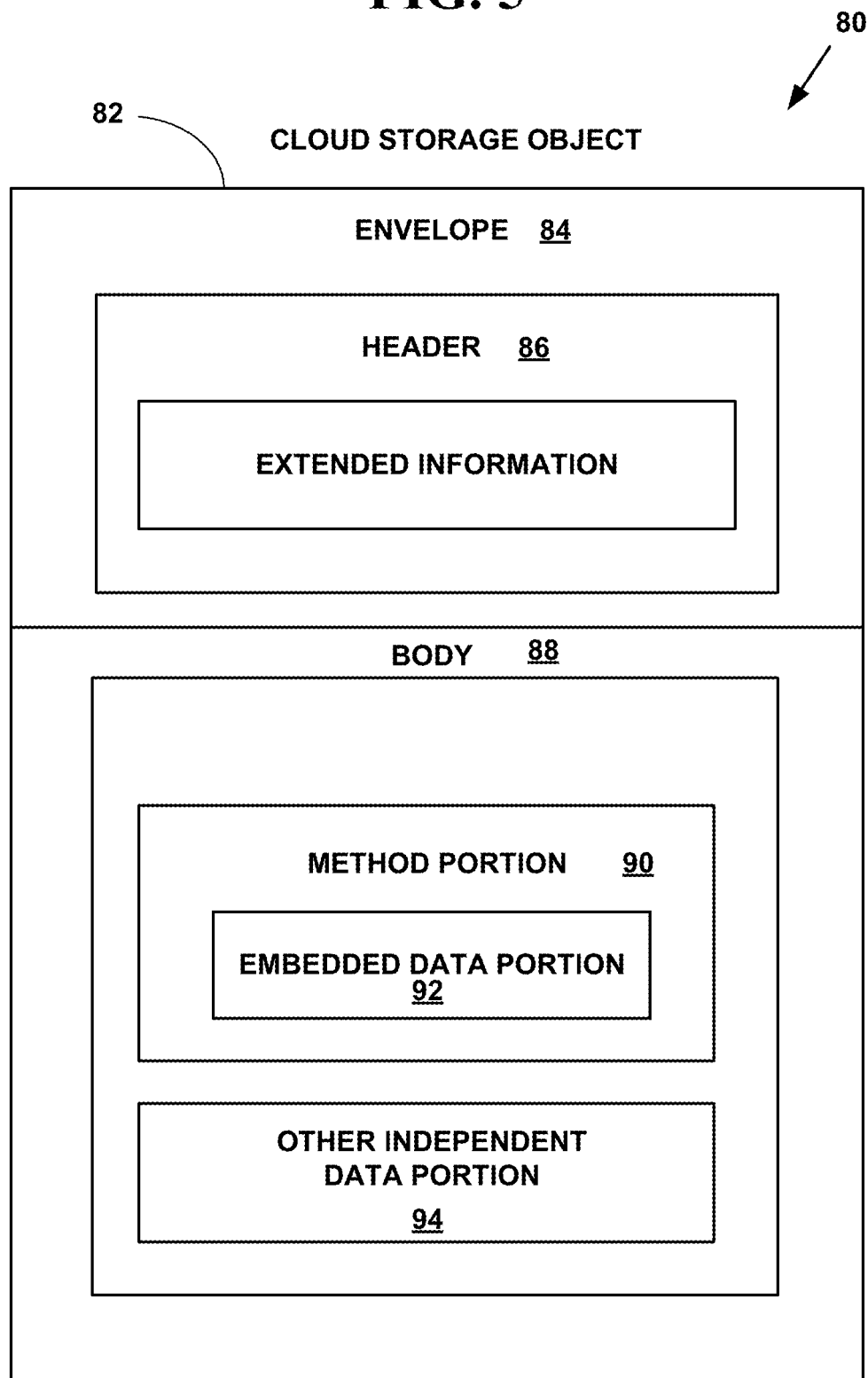
FIG. 5 is a block diagram illustrating an exemplary cloud storage object.

FIG. 5 is a block diagram 80 illustrating an exemplary cloud storage object 82. One or more server network devices (e.g., 20, 22, 24, 26, etc.) store portions 13', 15' of the telephone call content 13, 15 as cloud storage objects 82 (FIG. 5) as is described herein.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30a, 30b, 30c, 30d 30e.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction and provides access to automatic recorded robocall blocking services in a cloud or non-cloud environment. In one embodiment, the API for recorded robocall blocking interoperability services is available to network devices 12, 14, 16, 20, 22, 24, 26, 33, 98-104 and networks 18, 18'. However, the present invention is not limited to such an embodiment and other embodiments can be used to practice the invention.

Wearable Devices

Wearable technology" and/or "wearable devices" are clothing and accessories incorporating computer and advanced electronic technologies. Wearable network devices provide several advantages including, but not limited to: (1) Quicker access to notifications. Important and/or summary notifications are sent to alert a user to view the whole message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices take telemetric data recordings and providing useful feedback for users for exercise, health, fitness, etc. activities.

Figure 6:
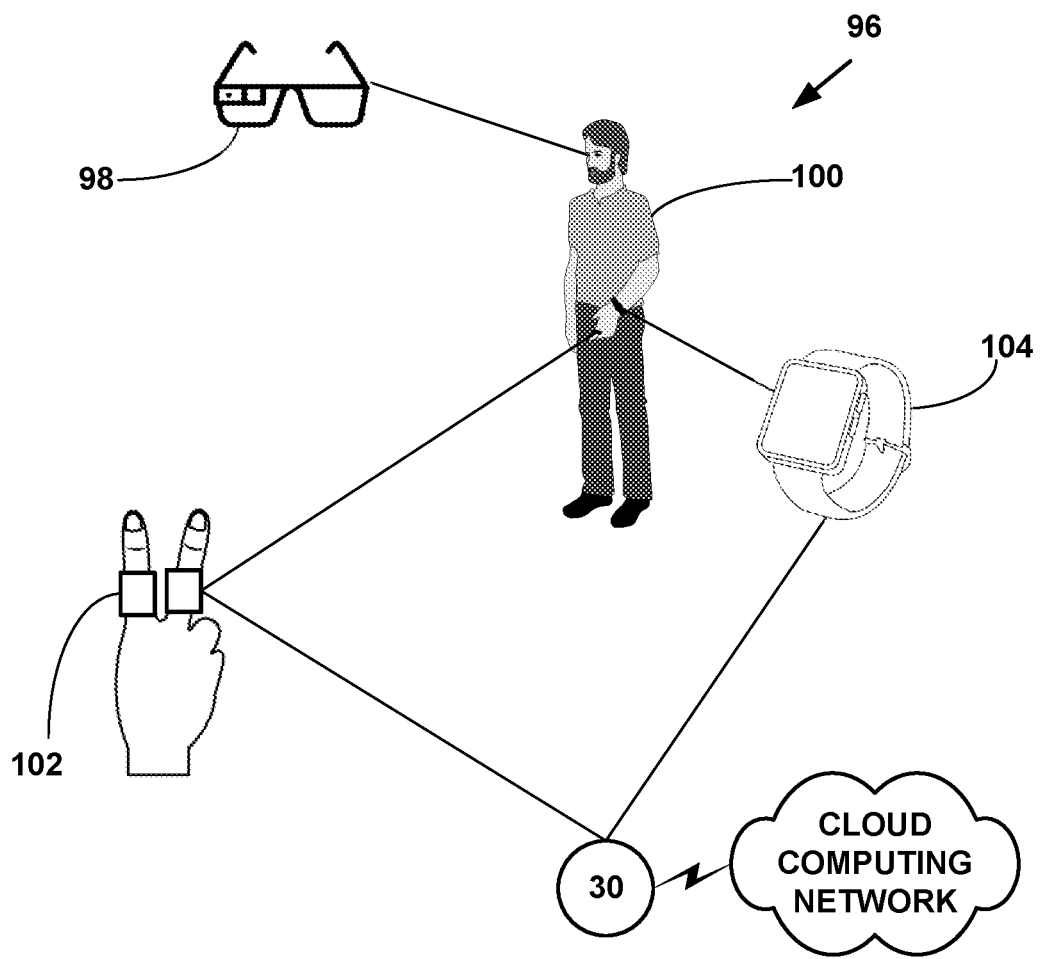
FIG. 6 is a block diagram illustrating wearable network devices.

FIG. 6 is a block diagram with 96 illustrating wearable devices. The wearable devices include one or more processors and include, but are not limited to, wearable digital glasses 98, clothing 100, jewelry 102 (e.g., smart rings, smart earrings, etc.) and/or watches 104. However, the present invention is not limited to such embodiments and more, fewer and other types of wearable devices can also be used to practice the invention.

In one specific embodiment, the application 30, 30a, 30b, 30c, 30d, 30e interacts with wearable devices 98-104 automatic robocall blocking services the methods described herein. However, the present invention is not limited this embodiment and other embodiments can also be used to practice the invention.

Artificial Intelligence (AI) and Big Data

"Artificial intelligence" (AI), also known as machine intelligence (MI), is intelligence demonstrated by machines, in contrast to the natural intelligence (NI) displayed by humans and other animals. AI research is defined as the study of "intelligent agents." Intelligent agents are any software application or hardware device that perceives its environment and takes actions that maximize its chance of successfully achieving its goals. Colloquially, the term "artificial intelligence" is applied when a machine mimics "cognitive" functions that humans associate with human brains, such as learning, problem solving and comparing large number of data points.

In one embodiment, the present invention uses one or more AI methods including, but are not limited to, AI knowledge-based methods 30c for (1) robocall blocking services. However, the present invention is not limited to such an embodiment and more, fewer and/or other AI methods can be used to practice the invention.

In one embodiment, SaaS 64 includes and AI application 30c with the AI methods described herein. In another embodiment, the AI application 30c is a standalone application. However, the present invention is not limited to such an embodiment, and the AI application 30c can be provided in other than the SaaS 64.

"Big Data" refers to the use of predictive analytic methods that extract value from data, and to a particular size of data set. The quantities of data used are very large, at least 100,000 data points and more typically 500,000 to 1 Million+ data points. Analysis of Big Data sets are used to find new correlations and to spot trends. In one embodiment, SaaS 64 includes and Big Data application 30d with the Big Data described herein.

In one embodiment, the AI methods described herein collect data information to create and store (e.g., in cloud storage object 82, etc.) a Big Data that is used to analyze trends find new correlations and to spot trends. However, the present invention is not limited to such an embodiment and the AI methods described herein can be used without Big Data sets.

In one embodiment, the AI methods are accomplished by a neural network having a plural input layers, hidden layers and output layers trained by data attributes by known blacklist callers in a common data store, as well as other sources of robocall originators from a carrier, government entity, or technical investigation.

A neural network, includes, but is not limited to, computing systems vaguely inspired by the biological neural networks that constitute biological brains. A neural network is based on a collection of connected units or nodes called artificial neurons, which loosely model the neurons in a biological brain.

In such an embodiment, the neural network includes a variety of transfer functions that are applied to robocall classification tasks, including in one form a sigmoid transfer function, sub-sigmoid or other differentiable function to classify continuous attributes.

In another embodiment, in another neural network, simple neutrons with linear transfer functions or square transfer functions used to classify callers by binary data or data with manual or machine generated thresholds.

In another embodiment, in another neural network, back-propagation is enabled to minimize classification error at a rate manually entered as a threshold or by error thresholds set by automatic analysis of historical robocall attributes in a databae=se.

In another embodiment, neuro-evolution is applied to the neural network for reinforcement learning. The neuro-evolution method trains new classifiers to recognize robocall patterns in data not preconceived, for example recognizing audio similarities between robocall audio captures with extended temporal occurrences.

In another embodiment, the AI methods include automatic classification and Bayesian probability methods to classify robocalls and/or in conjunction with a neural net to create a hybrid belief network with edge weighted probability networks. The edge probabilities automatically weigh the plurality outputs from analysis processes to improve the probability of robocall classification. Bayesian probability methods are a theory in the field of statistics based on the Bayesian interpretation of probability where probability expresses a degree of belief in an event. The degree of belief may be based on prior knowledge about the event, such as the results of previous experiments, or on personal beliefs about the event. This differs from a number of other interpretations of probability, such as the frequentist interpretation that views probability as the limit of the relative frequency of an event after many trials For the extraction of semantic data, robocall audio data is extracted from the robocall capture and natural language processing will isolate patterns of words and phonemes. Isolated words and speech elements will be added to plural data structures such as vectors, matrices, hash maps, trigrams, trees and Bayesian classification.

However, the present invention is not limited to such embodiments and the AI methods and neural network described herein and other embodiments may be used to practice the invention.

Short Message Service (SMS) Messaging

Short Message Service (SMS) is an electronic text messaging service component of phone, Web, or mobile communication systems. It uses standardized communications protocols to allow fixed line or mobile phone devices to exchange short text messages over a communications network 18'.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies as well as satellite and landline networks.

The SMS Internet Engineering Task Force (IETF) Request for Comments (RFC) 5724, ISSN: 2070-1721, 2010, is incorporated herein by reference.

Rich Communication Services (RCS)

Rich Communication Services (RCS) is a communication protocol between mobile telephone carriers and between phone and carrier, aiming at replacing SMS messages with a text-message system that is richer, provides phonebook polling (e.g., for service discovery), and can transmit in-call multimedia. It is also marketed under the names of Advanced Messaging, Advanced Communications, Chat, joyn, Message+ and SMS+.

One advantage RCS Messaging has over SMS is that RCS enables users to send rich, verified messages including photos, videos and audio messages, group messages, read receipts, indicators to show other users are typing a message, carousel messages, suggested chips, chat bots, barcodes, location integration, calendar integration, dialer integration, and other RCS messaging features. RCS messaging includes person-to-person (P2P) and application-to-person (A2P) messaging.

The GSM Association, Rich Communication Suite RCS API Detailed Requirements, version 3.0, 2017, is incorporated herein by reference. The RCS 3GPP and Open Mobile Alliance (OMA) standard Release 8.0 Version 9.0 (16.05.2018), is incorporated herein by reference.

Automatic Recorded Robocall Blocking Services

Figure 7B:
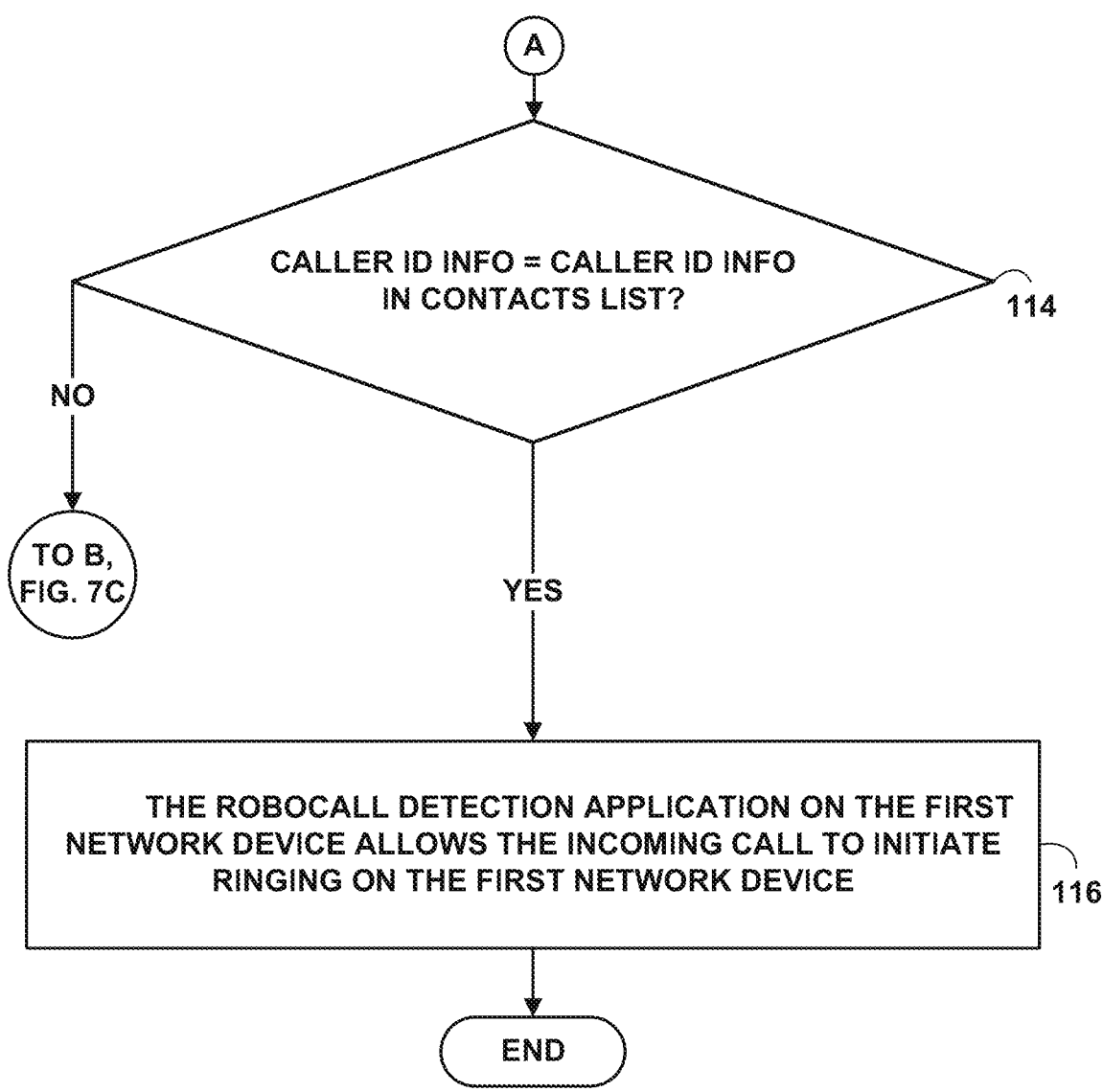
Figure 7C:
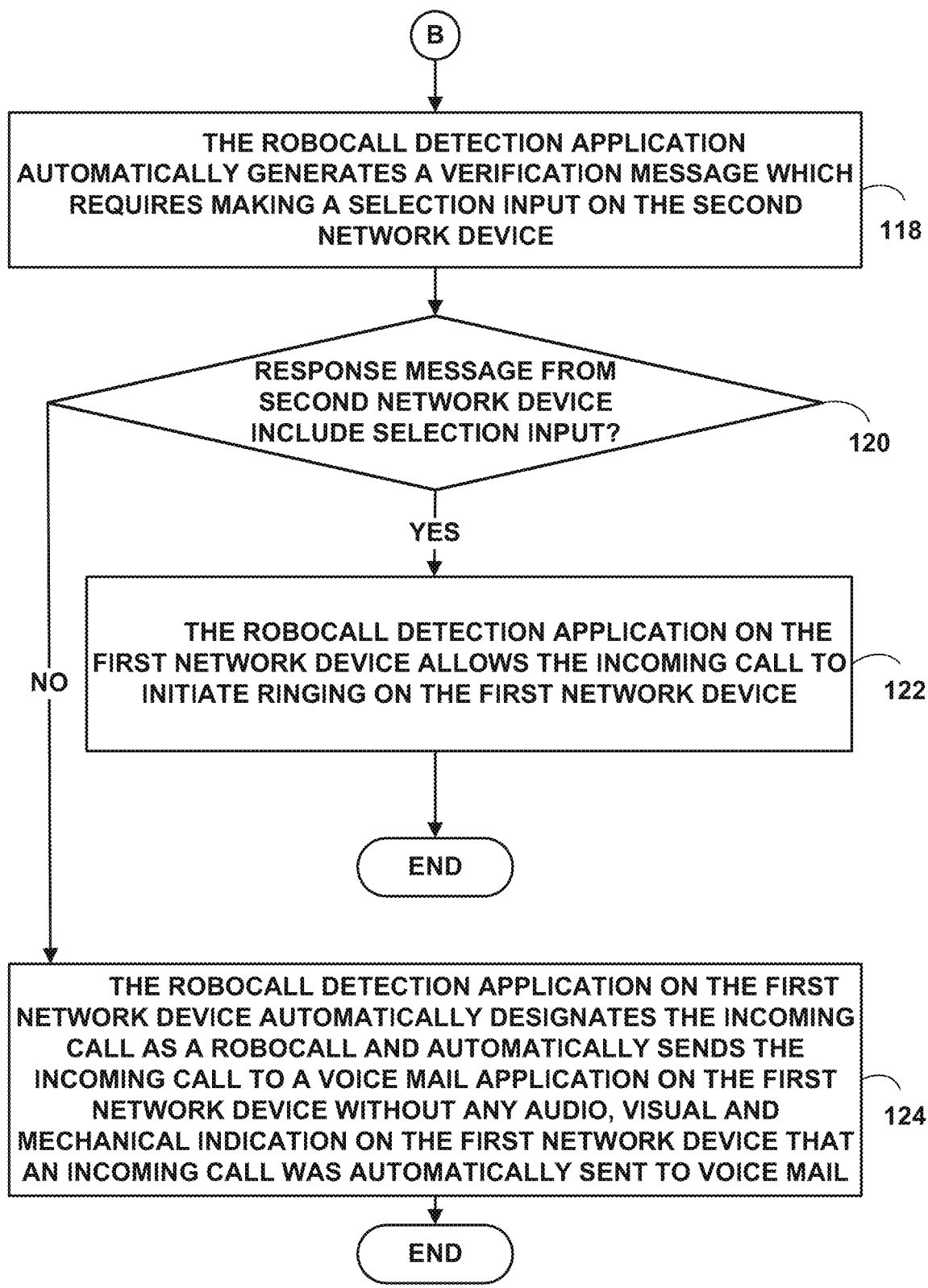

FIGS. 7A, 7B and 7C are a flow diagram illustrating a Method 106 for automatically blocking recorded robocalls. In FIG. 7A at Step 108, an incoming call is received on a robocall detection application on a first network device with one or more processors connected to a communications network from a second network device with one or more processors, the incoming call including caller identification information. At Step 110, the robocall detection application on the first network device automatically conducts a first test to determine if the caller identification information matches any caller identification information stored in a list of outgoing call numbers collected for outgoing calls made on the first network device. If the robocall detection application on the first network device determines with the first test at Step 110 that the caller identification information matches any caller identification information stored in the list of outgoing call numbers collected for outgoing calls made on the first network device, then at Step 112, the robocall detection application on the first network device allows the incoming call to initiate ringing on the first network device. If at Step 110, the robocall detection application on the first network device determines that the caller identification information does not match any caller identification identification stored in the list of outgoing call numbers collected for outgoing calls made on the first network device, then in FIG. 7B at Step 114, the robocall detection application on the first network device conducts a second test to determine if the caller identification information matches any caller identification information stored in a list of contact numbers on the first network device. If the robocall detection application on the first network device determines with the second test at Step 114 that the caller identification information matches any caller identification information stored in the list of contact numbers on the first network device then at Step 116, the robocall detection application allows the incoming call to initiate ringing on the first network device. If at Step 114, if the robocall detection application on the first network device determines with the second test at Step 112 that the caller identification information does not match any caller identification information stored in the list of contact numbers on the first network device then at Step 116, robocall detection application automatically determines if the incoming call includes an actual voice call instead of a robocall recording, in FIG. 7C at Step 118, the robocall detection application automatically generates and sends a verification message which requires making a selection input on the second network device. At Step 120 the robocall detection application on the first network device conducts a third test to determine whether a response message including the selection input is received from the second network device via the communications network within a pre-determined time period. If at Step 120, the robocall detection application on the first network device determines with the third test the response message including the selection input is received from the second network device via the communications network within the pre-determined time period, at Step 122, the robocall detection application on the first network allows the incoming call to initiate ringing on the first network device. If at Step 120, the robocall detection application on the first network device determines with the third test the response message including the selection input is not received from the second network device via the communications network, then at Step 124 the robocall detection application on the first network device automatically designates the incoming call as a robocall and sends the incoming call to a voice mail application on the first network device without any audio, visual and mechanical indication on the first network device that an incoming call was automatically sent to voice mail.

The present invention is illustrated with an exemplary embodiment. However, the present invention is not limited to such an embodiment and other embodiments can be used to practice the invention.

In such an exemplary embodiment in In FIG. 7A at Step 108, an incoming call 13, 13' 15 is received on a robocall detection application 30 on a first network device 12, 14, 16 (hereinafter incoming call 13 on first network device 12 for simplicity) with one or more processors connected to a communications network 18', 18' from a second network device 14, 16, 33, 98-104, 20, 22, 24, 26 with one or more processors, the incoming call 13 including caller identification information 21. The second network device includes one or more second target network devices 14, 16, 33, 98-104 and/or one or more server network devices 20, 22, 24, 26. However, the present invention is not limited to this embodiment, and other embodiments may be used to practice the invention.

In one embodiment, the call identification information 21 includes Caller ID (caller identification, CID) information, also called calling line identification (CLID), Calling Line Identification (CLI), calling number delivery (CND), calling number identification (CNID), calling line identification presentation (CLIP), or call display information. "Caller ID" is telephone service, available in analog and digital telephone systems, including VoIP, that transmits a caller's telephone number to the called party's telephone equipment when the call is being set up. The caller ID service may include the transmission of a name associated with the calling telephone number, in a service called CNAM. The Caller ID service was first defined in 1993 in International Telecommunication Union-Telecommunication Standardization Sector (ITU-T) Recommendation Q.731.3. which is incorporated herein by reference. However, the present invention is not limited to such an embodiment, and more, fewer or other types of Caller Id information can be used to practice the invention.

The recipient of an incoming call may inspect the Caller ID information 21 before answering the call on a display in the telephone set, on a separately attached device, or on other digital displays, such as cable television set top boxes, etc. Caller ID information 21 may be inaccurate, false, forged or spoofed. Hence, Caller ID information should not be fully relied upon to identify a caller. The root cause is a lack of authentication and accountability in the transmission of true identity of the network devices sending the Caller ID information.

In another embodiment, call identification information 21 includes a phone number, user name, device identifier, network address (e.g., IP address, etc.), hardware address (e.g., MAC address, etc.), and/or other unique identifier (e.g., Globally Unique Identifier (GUID), Universally Unique Identifier (UUID), etc.) to uniquely identify the second network device 14, 16, 33, 98-104, 20, 22, 24, 26 on the communications network 18'. However, the present invention is not limited to such an embodiment and other embodiments may be used to practice the invention.

In one embodiment, Step 108 further includes receiving an incoming call 13 as an incoming Short Message Service (SMS) and/or Rich Message Service (RCS) call connection message. However, the present invention is not limited to such an embodiment and other embodiments can be used to practice the invention.

At Step 110, the robocall detection application 30 on the first network device 12 automatically conducts a first test to determine if the caller identification information 21 matches any caller identification stored in a list of outgoing call numbers 23 collected for outgoing calls made on the first network device 12. If the robocall detection application 30 on the first network device 12 determines with the first test at Step 110 determines that the caller identification information 21 matches any caller identification stored in the list of outgoing call numbers 23 collected for outgoing calls made on the first network device 12, then at Step 112, the robocall detection application 30 on the first network device 12 allows the incoming call to initiating ringing on the first network device 12.

If at Step 110, the robocall detection application 30 on the first network device 12 determines that the caller identification information 21 does not match any caller identification stored in the list of outgoing call numbers 23 collected for outgoing calls made on the first network device, in FIG. 7B at Step 114, the robocall detection application 30 on the first network device 12 conducts a second test to determine if the caller identification information 21 matches any caller identification information stored in a list of contact numbers 25 on the first network device 12. Most every network device includes a list application or database application that collects and stores a list of contacts on the network device.

If the robocall detection application 30 on the first network device 12 determines with the second test in FIG. 7B at Step 114 that the caller identification information 21 matches any caller identification information 21 stored in the list of contact numbers 25 on the first network device then at Step 116, robocall detection application 30 on the first network device allows the incoming call 13 to initiate ringing on the first network device 12.

If at FIG. 7B at Step 114, if the robocall detection application 30 on the first network device 12 determines with the second test at Step 112 that the caller identification information 21 does not match any caller identification stored in the list of contact numbers 25 on the first network device 112 then at Step 116, the robocall detection application 30 on the first network device automatically determines if the incoming call 13 includes an actual voice call instead of a recording, then at FIG. 7C at Step 118 the robocall detection application 30 on the first network device 12 automatically generates a verification message on which requires generating a selection input on the second network device 14, 16, 33, 98-104, 20, 22, 24, 26.

The verification message is similar to the use of a CAPTCHA, a program or system intended to distinguish human from machine input, typically as a way of thwarting spam and automated extraction of data from websites. For example, one of the simplest CAPTCHA is to have a user click on a box that indicates "I am not a robot" before being allowed to access data, download data, or log into a computer system.

In the present invention, for example, in one embodiment the verification messages includes sending an automated verification message that says "press 1 to be connected," or "enter the code 123 to be connected." In such embodiments, if the incoming call 13 is an actual voice call being made by a human user and not a robocall recording, the human user can follow instructions included in the verification message to enter a selection input on the second network device 14, 16, 33, 98-104, 20, 22, 24, 26. If the incoming call 13 is a recorded robocall message, then no selection input will be completed on the second network device 14, 16, 33, 98-104, 20, 22, 24, 26 and no return message with the selection input will be sent back to the robocall detection application 30 on first network device 12.

In one embodiment, a unique code is automatically generated by the robocall detection application 30 on first network device 12 each time Step 114. The unique codes prevent spoofing by AI programs that may "learn" and/or use Big Data to "predict" or "guess" a selection input "to press 1" is always required to allow the incoming call 13 to initiate ringing on the first network device 12. However, the present invention is not limited to such an embodiment and other embodiments may be used to practice the invention.

At Step 120 the robocall detection application 30 on the first network device 12 conducts a third test to whether a response message including the selection input is received from the second network device 14, 16, 33, 98-104, 20, 22, 24, 26 via the communications network 18' with a pre-determined time period.

In one embodiment, the robocall detection application 30 waits only a pre-determined amount of time, such as one to five seconds, etc. for a response message. However, the present invention is not limited to such and embodiment and other embodiments may be used to practice the invention.

In one embodiment, the response message includes a Dual-Tone Multi-frequency (DTMF) response message. DTMF is a method used to dial telephone numbers or to issue commands to switching systems. DTMF is widely used for telecommunication signaling between telephone handsets and switching centers and over analog telephone lines in voice-frequency bands. However, the present invention is not limited to DTMF response messages and other types of response messages can be used to practice the invention.

In another embodiment, the response message includes a generated code message. A generated code includes a sequence of digits represented in DTMF, or a "knocking protocol" where the caller is asked to press any key a random number of times. For example, one exemplary knocking protocol includes requiring the caller to press any key two times, followed by pressing any key three times during one event, etc. In another one exemplary knocking protocol, a length and number of keypress sequences is randomly varied. Furthermore, more than one caller verification method and/or knocking protocol can be inserted for each incoming call. The varying of verification methods is desirable to confuse counter-analysis by robocall systems, diffuse the exploitable knowledge of such methods and increase the cost of robocall activity while diminishing robocall effectiveness. A variable, random or increasing/decreasing time interval between failed attempts at repeating a code sequence for verification, failed attempts and repeat attempt is used in association of the generated codes.

In another embodiment, the response message includes a response message with one or more data fields set in a data packet such as a VoIP, IP, TCP, UDP, etc. data packet. However, the present invention is not limited to data packet response messages and other types of response messages can be used to practice the invention.

If at Step 120, the robocall detection application 30 on the first network device 12 determines with the third test the response message including the selection input is received from the second network device 14, 16, 33, 98-104, 20, 22, 24, 26 via the communications network 18' within the pre-determined time period, at Step 122, the robocall detection application 30 on the first network device 12 allows the incoming call to initiating ringing on the first network device 12.

If at Step 120, the robocall detection application 30 on the first network device 12 determines with the third test the response message including the selection input is not received from the second network device 14, 16, 33, 98-104, 20, 22, 24, 26 via the communications network 18' within the pre-determined time period, then Step 124 the robocall detection application 30 on the first network device 12 automatically designates the incoming call 13 as a "robocall" and sends the incoming call 13 to a voice mail application 30e on the first network device 12 without any audio, visual and mechanical indication on the first network device 12 that an incoming call was automatically sent to voice mail. The caller identification information 21 for the incoming call is then added to a list of known robo call numbers on the first network device 12 and/or in other databases and/or cloud storage objects 82.

In another embodiment if the incoming call 13 is a Short Message Service (SMS) and/or Rich Message Service (RCS) message, at Step 124 the robocall detection application 30 on the first network device 12 automatically designates the incoming call 13 as a "robocall" and sends the incoming call 13 to a messaging application on the first network device 12 without any audio, visual and mechanical indication on the first network device 12 that an incoming call was automatically sent to voice mail. The present invention is not limited to such an embodiment and other embodiments can be used to practice the invention.

In one embodiment, Step 124 further includes adding the caller identification information 21 determined to be a recorded robocall at Step 124 of Method 106 for the incoming call 13 to a list of global blacklisted numbers 27 stored in first one or more cloud storage objects 82a on a cloud communications network 18 (e.g., Step 130, Method 126) and to a list of user defined blacklisted numbers 29 stored in one or more second cloud storage objects 82b on the cloud communications network 18 (e.g., Step 134, Method 126).

Method 106 automatically identifies and processes recorded robocalls and help prevents call spoofing and neighbor spoofing by recorded robocalls.

FIGS. 8A, 8B and 8C are a flow diagram illustrating a Method 126 for automatically blocking recoded robocalls.

In FIG. 8A at Step 128, an incoming call is received on a robocall detection application on a first network device with one or more processors connected to a cloud communications network from a second network device with one or more processors, the incoming call including caller identification information. At Step 130, the robocall detection application on the first network device automatically conducts a first test to determine if the caller identification information matches any caller identification information stored in a list of global blacklisted numbers stored in first one or more cloud storage objects on the cloud communications network. If the robocall detection application on the first network device determines with the first test at Step 130 that the caller identification information matches any caller identification information stored in a list of global blacklisted numbers stored in one or more first cloud storage objects on the cloud communications network, then at Step 132, the robocall detection application on the first network device automatically designates the incoming call as a robocall and sends the incoming call to a voice mail application on the first network device without any audio, visual and mechanical indication on the first network device that an incoming call was automatically sent to voice mail. If the robocall detection application on the first network device determines with the first test at Step 130 that the caller identification information does not match any caller identification information stored in a list of global blacklisted numbers stored in the one or more first cloud storage objects on the cloud communications network, then in FIG. 8B at Step 134, the robocall detection application on the first network device conducts a second test to determine if the caller identification information matches any caller identification information in a list of user defined blacklisted numbers stored in one or more second cloud storage objects on the cloud communications network. If the robocall detection application on the first network device determines with the second test at Step 134 that the caller identification information matches any caller identification information in a list of user defined blacklisted numbers stored in the one or more second cloud storage objects on the cloud communications network, then at Step 136, the robocall detection application on the first network device automatically designates the incoming call as a robocall and sends the incoming call to a voice mail application on the first network device without any audio, visual and mechanical indication on the first network device that an incoming call was automatically sent to voice mail. If the robocall detection application on the first network device determines with the second test at Step 134 that the caller identification information does not match any caller identification information in a list of user defined blacklisted numbers stored in the one or more second cloud storage objects on the cloud communications network, then in FIG. 8C at Step 138 a third test is conducted to determine if the caller identification information matches any caller identification information in a list of user defined whitelisted numbers stored in one or more third cloud storage objects on the cloud communications network. If the robocall detection application on the first network device determines with the third test at Step 138 that the caller identification information matches any caller identification information in the list of user defined whitelisted numbers stored in one or more third cloud storage objects on the cloud communications network, then at Step 140, the robocall detection application on the first network allows the incoming call to initiate ringing on the first network device. If the robocall detection application on the first network device determines with the third test at Step 138 that the caller identification information does not match any caller identification information in the list of user defined whitelisted numbers stored in the one or more third cloud storage objects on the cloud communications network, then at Step 142, the robocall detection application on the first network device automatically designates the incoming call as a robocall and sends the incoming call to a voice mail application on the first network device without any audio, visual and mechanical indication on the first network device that an incoming call was automatically sent to voice mail.

The present invention is illustrated with an exemplary embodiment. However, the present invention is not limited to such an embodiment and other embodiments can be used to practice the invention.

In such an exemplary embodiment in In FIG. 8A at Step 128 at Step 108, an incoming call 13, 13' 15 is received on a robocall detection application 30 on a first network device 12, 14, 16 (hereinafter incoming call 13 on first network device 12 for simplicity) with one or more processors connected to a cloud communications network 18, 18' from a second network device 14, 16, 33, 98-104, 20, 22, 24, 26 with one or more processors, the incoming call 13 including caller identification information 21. The second network device includes one or more second target network devices 14, 16, 33, 98-104 and/or one or more server network devices 20, 22, 24, 26. However, the present invention is not limited to this embodiment, and other embodiments may be used to practice the invention.

In one embodiment, the robocall detection application 30 includes a cloud SaaS 64 application providing cloud based automatic recorded robocall blocking services. In another embodiment, the robocall detection application 30 includes a thin client application that interacts with a cloud server based SaaS 64 application. However, the present invention is not limited to these embodiments and the robocall detection application 30 can include a non-cloud application that interacts with cloud based applications and cloud based services.

At Step 130, the robocall detection application 30 on the first network device 12 automatically conducts a first test to determine if the caller identification information 21 matches any caller identification information stored in a list of global blacklisted numbers 27 stored in one or more first cloud storage objects 82a on a cloud communications network 18.

If the robocall detection application 30 on the first network device 12 determines with the first test at Step 130 that the caller identification information 21 matches any caller identification information stored in the list of global blacklisted numbers 27 stored in one or more first cloud storage objects 82a on the cloud communications network 18, then at Step 132, the robocall detection application 30 on the first network device 12 automatically designates the incoming call as a robocall and sends the incoming call to a voice mail application 30e on the first network device 12 without any audio, visual and mechanical indication on the first network device 12 that an incoming call was automatically sent to voice mail.

If the robocall detection application 30 on the first network device 12 determines with the first test at Step 130 that the caller identification information 21 does not match any caller identification information stored in the list of global blacklisted numbers 27 stored in the one or more first cloud storage objects 82a on the cloud communications network 18, then in FIG. 8B at Step 134, the robocall detection application 30 on the first network device 12 conducts a second test to determine if the caller identification information matches any caller identification information in a list of user defined blacklisted numbers 29 stored in one or more second cloud storage objects 82b on the cloud communications network 18.

If the robocall detection application 30 on the first network device 12 determines with the second test at Step 134 that the caller identification information 21 matches any caller identification information in the list of user defined blacklisted numbers 29 stored in the one or more second cloud storage objects 82b on the cloud communications network 18, then at Step 136, the robocall detection application 30 on the first network device 12 automatically designates the incoming call as a robocall and sends the incoming call to a voice mail application 30e on the first network device 12 without any audio, visual and mechanical indication on the first network device that an incoming call was automatically sent to voice mail.

If the robocall detection application 30 on the first network device 12 determines with the second test at Step 134 that the caller identification information 21 does not match any caller identification information in the list of user defined blacklisted numbers 29 stored in the one or more second cloud storage objects 82b on the cloud communications network, then in FIG. 8C at Step 138 a third test is conducted to determine if the caller identification information 21 matches any caller identification information in a list of user defined whitelisted numbers 31 stored in one or more third cloud storage objects 82c on the cloud communications network 18.

If the robocall detection application 30 on the first network device 12 determines with the third test at Step 138 that the caller identification information 21 matches any caller identification information in the list of user defined whitelisted numbers 31 stored in the one or more third cloud storage objects 82c on the cloud communications network 18, then at Step 140, the robocall detection application 30 on the first network 12 allows the incoming call to initiate ringing on the first network device 12.

If the robocall detection application 30 on the first network device 12 determines with the third test at Step 138 that the caller identification information 21 does not match any caller identification information in the list of user defined whitelisted numbers 31 stored in the one or more third cloud storage objects 82c on the cloud communications network 18, then at Step 142, the robocall detection application 30 on the first network device 12 automatically designates the incoming call 13 as a robocall and sends the incoming call 13 to a voice mail application 30e on the first network device 12 without any audio, visual and mechanical indication on the first network device 12 that an incoming call was automatically sent to voice mail.

Method 126 automatically identifies and processes recorded robocalls and help prevents call spoofing and neighbor spoofing by recorded robocalls.

A method and system is presented herein for automatically blocking recorded robocalls. Caller identification information from an incoming is checked with plural different tests and with one test that requires a caller input a selection input. Requiring a response from such a selection input provides an additional level of detection for recorded robocalls. In addition, plural different cloud based databases of known robocall numbers are checked with plural different tests with cloud based Software as a Service (SaaS) applications to provide other levels of detection for recorded robocalls. The method and system automatically identify and process recorded robocalls and help prevent call spoofing and neighbor spoofing by recorded robocalls.

Voice Based Robocalls

In addition to recorded robocalls, there are robocalls that are generated by an actual live person and/or generated with natural and/or artificial synthesized voices. Such robocalls include and/or do not include caller identification information. Such voice based robocalls need to be handled as well.

FIGS. 9A, 9B, 9C and 9D are a flow diagram illustrating a Method 144 for automatically blocking robocalls.

Figure 9B:
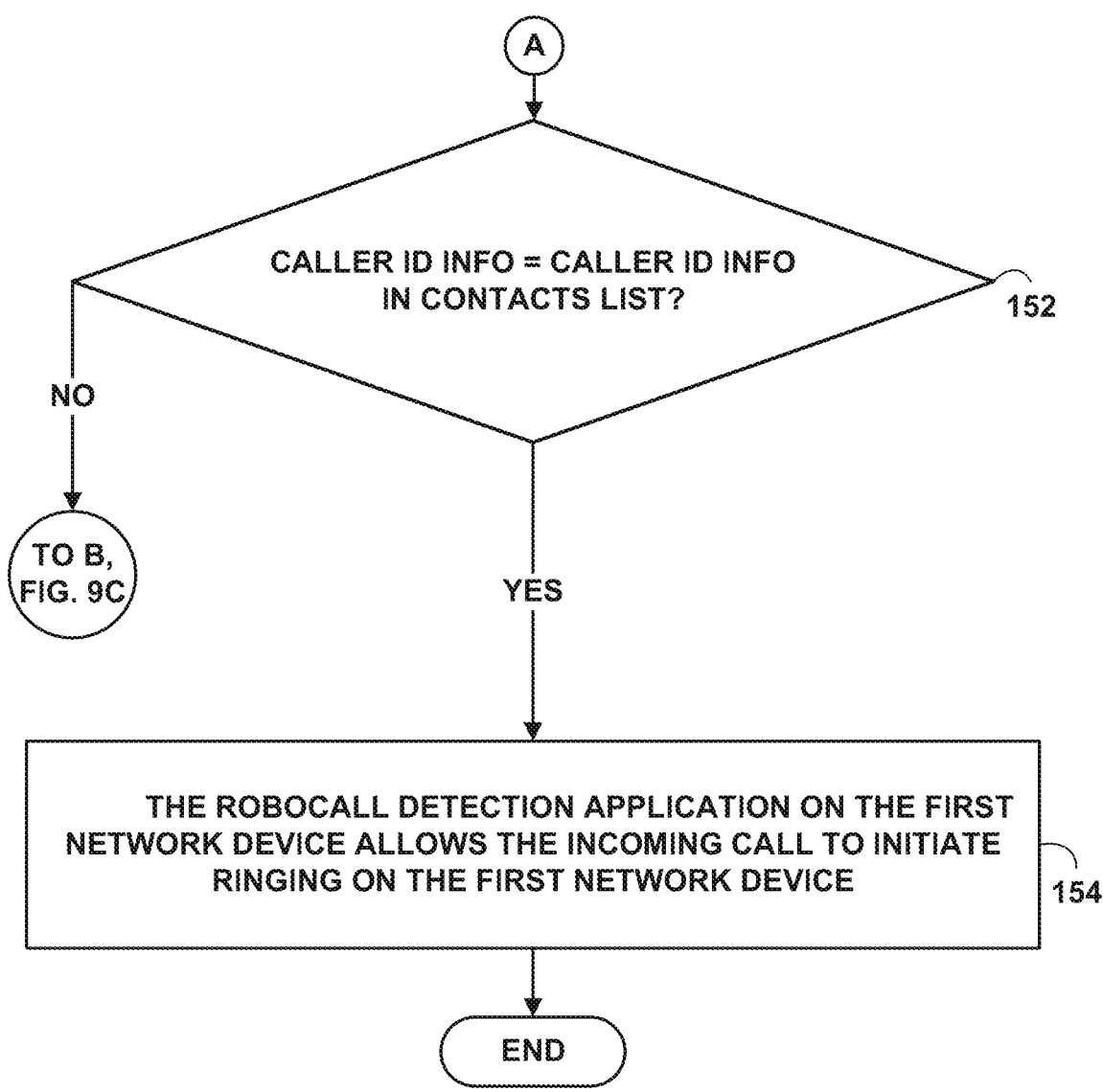

In FIG. 9A at Step 146, an incoming call is received on a robocall detection application on a first network device with one or more processors connected to a communications network from a second network device with one or more processors, the incoming call including caller identification information. At Step 148, a first test is conducted to determine automatically on the robocall detection application on the first network device if the caller identification information matches any caller identification stored in a list of outgoing call numbers collected for outgoing calls made on the first network device. If for the test at Step 148, the robocall detection application on the first network device automatically determines that the caller identification information from the incoming call matches any caller identification information stored in a list of outgoing call numbers collected for outgoing calls made on the first network device, then at Step 150, the robocall detection application is allowed to initiate ringing for the incoming call on the first network device. If for the test at Step 148, the robocall detection application on the first network device determines that the caller identification information from the incoming call does not match any caller identification stored in a list of outgoing call numbers collected for outgoing calls made on the first network device, then in FIG. 9B at Step 152, a second test is conducted to determine automatically on the robocall detection application on the first network device if the caller identification information from the incoming call matches any caller identification information stored in a list of contact numbers on the first network device. If for the test at Step 152, the caller identification information matches any caller identification stored in a list of contact numbers on the first network device, then at Step 154, the robocall detection application is allowed to initiate ringing for the incoming call on the first network device. If for the test at Step 152, the caller identification information does not match any caller identification information stored in a list of contact numbers on the first network device, then in FIG. 9C at Step 156, the robocall detection application on the first network device automatically captures a set of incoming call data from the incoming call. At Step 158, a third test is conducted on the the robocall detection application on the first network device automatically using an Artificial Intelligence (AI) application to determine whether the call is a voice based robocall using one or more AI robocall knowledge based methods. The one or more AI robocall knowledge based methods including, but not limited to, analyzing the captured call audio data, call metadata and call record data to identify any foreground audio characteristics and background audio characteristics from the incoming call generated by equipment, methods and techniques used by organizations generating robocalls. If the test at Step 158 the robocall detection application on the first network device determines the incoming call is not a robocall, then at Step 160, the robocall detection application on the first network device is allowed to initiate ringing for the incoming call on the first network device. If the test at Step 158 determines the incoming call is a voice based robocall, In FIG. 9D at Step 162, the robocall detection application on the first network device automatically designates the incoming call as a robocall. A Step 164, the robocall detection application on the first network device automatically sends the incoming call to a voice mail application on the first network device without any audio, visual and mechanical indication on the first network device that an incoming call was automatically sent to voice mail. At Step 166, the robocall detection application on the first network device adds call identification information and the set of incoming call data captured from the incoming call designated as a robocall to a Big Data set used by the AI application to further find new correlations and to spot new trends related to new automatic robocall generation.

The present invention is illustrated with an exemplary embodiment. However, the present invention is not limited to such an embodiment and other embodiments can be used to practice the invention.

In such an exemplary embodiment in FIG. 9A at Step 146, on a first network device 12, 14, 16 (hereinafter incoming call 13 on first network device 12 for simplicity) with one or more processors connected to a communications network 18, 18' from a second network device 14, 16, 33, 98-104, 20, 22, 24, 26 with one or more processors, the incoming call 13 including caller identification information 21. The second network device includes one or more second target network devices 14, 16, 33, 98-104 and/or one or more server network devices 20, 22, 24, 26. However, the present invention is not limited to this embodiment, and other embodiments may be used to practice the invention.

At Step 148, the robocall detection application 30 on the first network device 12 automatically conducts a first test to determine if the caller identification information 21 matches any caller identification information 21 stored in a list of outgoing call numbers 23 collected for outgoing calls made on the first network device 12. If the robocall detection application 30 on the first network device 12 determines with the first test at Step 148 that the caller identification information 21 matches any caller identification information stored in the list of outgoing call numbers 23 collected for outgoing calls made on the first network device 12, then at Step 150, the robocall detection application 30 on the first network device 12 allows the incoming call to initiating ringing on the first network device 12.

If for the test at Step 148, the robocall detection application 30 on the first network device 12 determines that the caller identification information 21 does not match any caller identification information 21 stored in the list of outgoing call numbers 23 collected for outgoing calls made on the first network device, in FIG. 9B at Step 152, the robocall detection application 30 on the first network device 12 conducts a second test to determine if the caller identification information 21 matches any caller identification information 21 stored in a list of contact numbers 25 on the first network device 12. Most every network device includes a list application or database application that collects and stores a list of contacts on the network device.

If the robocall detection application 30 on the first network device 12 determines with the second test in FIG. 9B at Step 152, that the caller identification information 21 matches any caller identification information 21 stored in the list of contact numbers 25 on the first network device then at Step 154, robocall detection application 30 on the first network device allows the incoming call 13 to initiate ringing on the first network device 12.

If at FIG. 9B for the second test at Step 152, if the robocall detection application 30 on the first network device 12 determines that the caller identification information 21 does not match any caller identification information 21 stored in the list of contact numbers 25 on the first network device 12 then, the robocall detection application 30 on the first network device automatically determines if the incoming call 13 includes a voice call instead of a recording.

In FIG. 9C at Step 156, the robocall detection application 30 on the first network device 12 automatically captures a set of call incoming call data 13a from the incoming call, including, but not limited to, call audio data, call metadata and/or call record data. However, the present invention is not limited to such an embodiment and other embodiments can be used to practice the invention.

In one embodiment, the call audio data all audio information captured from the incoming call 13, including but not limited to, audio data, noise data, and/or artifact data (e.g., any error in a perception or representation of any audio information, etc.). However, the present invention is not limited to such an embodiment and more, fewer and other types of information can be used for the call audio data.

In one embodiment, the call metadata, includes, but is not limited to, time of day, duration, type of network device, channel, port, protocol, network address, calling number, called number, etc. However, the present invention is not limited to such an embodiment and more, fewer and other types of information can be used for the call metadata.

In one embodiment, the call record data includes, but is not limited to, a data record produced by a telephone exchange or other telecommunications equipment that documents the details of a telephone call or other telecommunications transaction (e.g., text message) that passes through that facility or device. The record includes, various attributes of the call, such as time of day, duration, completion status, source number, and/or destination number, etc. However, the present invention is not limited to such an embodiment and more, fewer and other types of information can be used for the call record data.

In one embodiment, robocall detection application 30 on the first network device 12 analyzes the call audio data from the captured set of incoming call data 13a to determine whether the captured call audio data 13a includes actual live voice data, synthesized voice data, recorded live voice data and/or recorded synthesized voice data in the incoming call 13. In such an embodiment, the robocall detection application 30 uses one or more speech and/or audio pattern recognition methods to determine if, and to what degree, the robocall is using a live human voice, and/or using natural generated voices and/or artificial synthesized voices. The one or more speech recognition and/or audio pattern methods, include, but are not limited to, analyzing audio background information because actual live voice data, natural synthesized voice data, artificial synthesized voice data, recorded live voice data and/or recorded natural and artificial synthesized voice data in the incoming call 13 is almost always generated with various sequences of recording speech patterns with varying background and effects including ambient, white, brown or pink noise.

Ambient noise is any sound other than the sound being monitored. Ambient noise is a form of noise interference. White noise includes a difference between background sounds and a "peak" sound. Pink noise, or "1/frequency" noise includes a signal or process with a frequency spectrum such that a power spectral density is inversely proportional to a frequency of the signal. In pink noise, each octave carries an equal amount of noise energy. Brown noise includes a sound masking tool, that blocks out external sounds and distractions. Compared to white and pink noise, brown noise uses mostly lower audio frequencies. However, the present invention is not limited to such embodiments and other embodiments can be used to practice the invention.

In one embodiment, Step 156, further includes the steps of: capturing on robocall detection application 30 in the set of incoming call data 13a from the incoming call 12, call information including, but not limited to, call audio data, call metadata and call record data; storing the captured set of incoming call data 13a on the robocall detection application 30 the first network device 12; extracting from the captured set of incoming call data 13a for analysis including: amplitude levels of the captured call audio data, noise and distortion of the captured call audio data, pulse and transitions of the captured call audio data, waveforms of the captured call audio data, frequency characteristics of the captured call audio data, spectral characteristics of the captured audio data, and time domain characteristics of the captured call audio data to automatically identify entities, organizations, techniques, methods and equipment used for generating robocalls; and automatically deleting on the robocall detection application 30 the stored captured set of call information on the first network device 12 after analysis. In one embodiment, the analysis is completed by the AI application 30c. In another embodiment, the analysis is completed by the robocall application 30. However, the present invention is not limited to such additional steps and such embodiments and other steps and other embodiments can be used to practice the invention.

Audio amplitude, includes a fluctuation or displacement of an audio wave from its mean value. With sound waves, it is an extent to which air particles are displaced, and this amplitude of sound or sound amplitude is experienced as a loudness of sound. Audio noise any unwanted sound that is unintentionally added to a desired sound. Audio noise is typically present on digital audio data streams. Audio distortion is any change in a content of an electrical signal or a shape of an audio or sound wave during its transmission. It is also described as information either lost or added relative to the original signal. Audio distortion can be placed in two broad categories: Type 1 —linear, altered amplitude content; and Type 2 —nonlinear, added frequency content. An audio pulse includes one of a series of regularly recurring, precisely equivalent stimuli. An audio pulse includes beats in a repeating of identical yet distinct periodic short-duration stimuli perceived as points in time. An audio transition includes a fade in, fade out, or crossfade. Audio waveforms represent a shape and form of audio waves and sound waves passing through a medium. Audio frequency includes a periodic vibration whose frequency is in a band audible to the average human, a human hearing range. The unit of frequency is the Hertz (Hz), or cycles-per-second. Frequency is the property of sound that most determines pitch. Frequency domain analysis shows how much of a signal lies within each given frequency band over a range of frequencies. An audio spectrum includes an audible frequency range at which humans can hear and spans from 20 Hz to 20,000 Hz. The audio spectrum can be effectively broken down into seven different frequency bands, with each band having a different impact on the total sound. Spectral analysis or Spectrum analysis is analysis in terms of a spectrum of audio or other frequencies or related quantities such as energies, eigenvalues, etc. Time domain includes physical signals analyzed with respect to time. Time domain analysis shows how a signal changes over time. However, the present invention is not limited to these definitions and robocall analysis techniques and more, fewer and/or other robocall analysis techniques can be used to practice the invention.

At Step 158, a third test is conducted on the robocall detection application 30 on the first network device 12 using an Artificial Intelligence (AI) application 30c to automatically determine whether the incoming call 13 is a voice call and a robocall using one or more AI robocall knowledge based methods. The one or more AI robocall knowledge based methods including, but not limited to, analyzing the captured set of incoming call data 13a including the call audio data, call metadata and call record data to identify any foreground audio characteristics and any background audio characteristics from the incoming call 12 generated by equipment, methods and techniques used by organizations generating robocalls.

In one embodiment, patterns of unique audio signal noise and call carrier artifacts are identified and associated with a unique origin of the incoming call 13, then compared with other incoming call information to identify whether multiple robocalls for different campaigns share the same location, equipment, method and techniques for generating robocalls. However, the present invention is not limited to such an embodiment and other embodiments can be used to practice the invention.

If the third test at Step 158, determines the incoming call 13 is a voice call and not a robocall, then at Step 160, the robocall detection application 30 on the first network device 12 is allowed to initiate ringing for the incoming call 13 on the first network device 12.

Figure 9D:
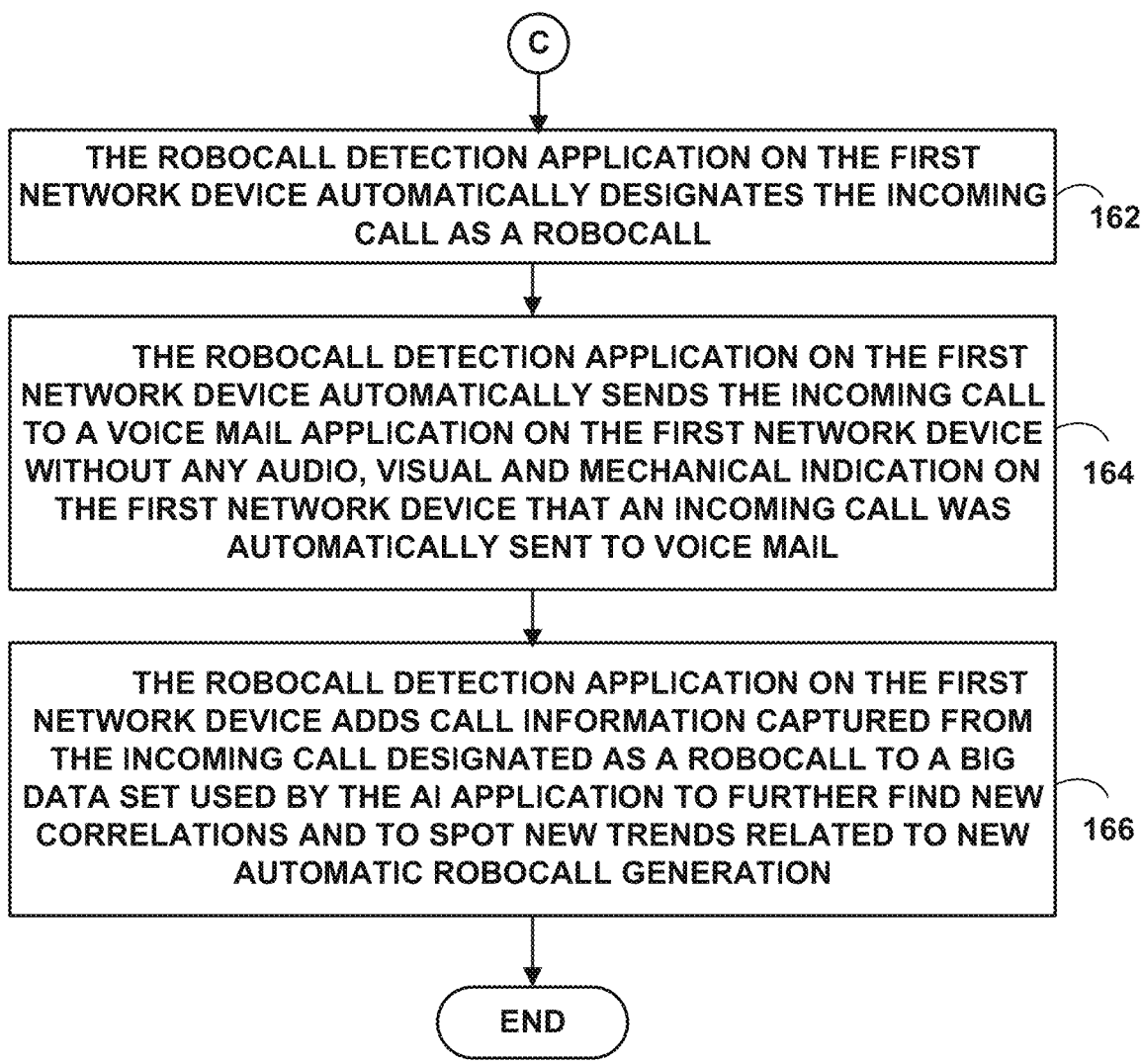

If the third test at Step 158, determines the incoming is a robocall, In FIG. 9D at Step 162, the robocall detection application 30 on the first network device 12 automatically designates the incoming call 13 as a robocall.

A Step 164, the robocall detection application 30 on the first network device 12 automatically sends the incoming call 13 to a voice mail application 30e on the first network device 12 without any audio, visual and mechanical indication on the first network device 12 that an incoming call 13 was automatically sent to voice mail.

At Step 166, the robocall detection application 30 on the first network device 12 adds the captured set of incoming call data 13a and the caller identification information 21 captured from the incoming call 13 designated as a robocall to a Big Data set 30d' used by the AI application 30c to further find new correlations and to spot new trends related to new automatic robocall generation.

In one specific embodiment, if the robocall detection application 30 on the first network device 12 cannot automatically determine the incoming call is a voice robocall at Step 158, an additional robocall ruleset is used for routing the incoming call 13 via the communications network 18, 18' to a designated human agent and/or machine agent for further analysis. Using such a ruleset, incoming call 13 information is packaged in a data structure and represented in a binary or other encoded format, allowing data views suitable for analysis, including a visual display presented to a user of a server network device 20, 22, 24 26 and/or surrogate human and/or machine robocall analyst, to determine if the incoming call is a voice robocall and/or other type of robocall. Complex multimedia including robocall information can be decompressed (if lossless compressed) and decrypted (if encrypted) by a managed surrogate device in order to detect, catalog and block robocall generated data in non-audio captures. An administrative user on the server network device 20, 22, 24, 26 is allowed to review the AI methods being used and change the models and rulesets used for robocall detection, usage of the backend cloud, integration with cloud and non-cloud services.

In another specific embodiment, a proxy network device with one or more processors 20, 22, 24, 26 is used between any set of network devices intended for person-to-person audible interaction and detects and mitigates not just robocalls but any such audio transmission or audio utterance intended as or determined to be a nuisance. However, the present invention is not limited to such an embodiment and other embodiments can be used with and/or without a proxy network device 20, 22, 24, 26.

FIG. 10 is a flow diagram illustrating a Method 168 for automatically blocking robocalls. At Step 170, a robocall detection application on a first network device with one or more processors captures in a set of incoming call data, call audio data, call metadata and call record data from an incoming call from a second network device with one or more processors. At Step 172, the robocall detection application on the first network device stores the captured set of incoming call data on the first network device. At Step 174, the robocall application on the first network device extracts from the captured set of incoming call data for analysis including: amplitude levels of the captured call audio data, noise and distortion of the captured call audio data, pulse and transitions of the captured call audio data, waveforms of the captured call audio data, frequency characteristic of the captured call audio data, spectral characteristics of the captured audio data and time domain characteristics of the captured call audio data, to automatically identify entities, organizations, techniques, methods and equipment used for generating robocalls. At Step 176, the robocall detection application on the first network device automatically deletes on the stored captured call information on the first network device after analysis.

The present invention is illustrated with an exemplary embodiment. However, the present invention is not limited to such an embodiment and other embodiments can be used to practice the invention.

In such an exemplary embodiment in FIG. 10 at Step 170, a robocall detection application 30 on a first network device 12 with one or more processors captures a set of incoming call data 13*a*, including but not limited to, call audio data, call metadata and call record data, from an incoming call 13 from a second network device 14, 16, 33, 98-104, 20, 22, 24, 26 with one or more processors.

In one embodiment, Step 170 further includes the steps of: compressing incoming call audio data from captured set of incoming call data 13*a* on the robocall detection application 12 with one or more audio compressing techniques; sending the compressed captured call audio data, call metadata and call record data to a server network device 20, 22, 24, 26 with one or more processors via the communications network 18, 18'. The server network device 20, 22, 24, 26 stores and adds the compressed captured call audio data to the Big Data set 30*c*' used by the AI application 30*c* on the first network device 12; and displaying in real-time on a graphical display component 34 on a display component 34 on the server network device 20, 22, 24, 26 incoming robocall detection information, to further find new correlations and to spot new trends related to new automatic robocall generation. In one embodiment, the compressed call audio data is also encrypted with one or more encryption and/or security methods described herein before sending. However, the present invention is not limited to such embodiments and other embodiments can be used to practice the invention.

In one embodiment, the captured call audio data is compressed with one or more lossy compression techniques. "Lossy compression" or irreversible compression is the class of data encoding methods that uses inexact approximations and partial data discarding to represent the content. These techniques are used to reduce data size for storing, handling, and transmitting content. Lossy compression permits reconstruction only of an approximation of the original data, though usually with greatly improved compression rates. Lossy compression formats, include, but are not limited to, Audio Codec-3 (AC3), Digital Theater System (DTS), Advanced Audio Coding (AAC), Motion Pictures Expert Group (MPEG)-1/2/3/4, VORBIS, REAL AUDIO, etc. However, the present invention is not limited to such embodiments and other types of audio compression techniques and other embodiments can be used to practice the invention.

In another embodiment, the captured call audio data is compressed with one or more lossless compression techniques. "Lossless compression" is a class of data compression algorithms that allows the original data to be perfectly reconstructed from the compressed data. Lossless compression formats include, but are not limited to, Free Lossless Audio Codec (FLAG), WAVPAK, MONKEY's Audio, ALAC (APPLE Lossless), etc. lossless audio compression techniques. However, the present invention is not limited to such embodiments and other types of audio compression techniques and other embodiments can be used to practice the invention.

However, the present invention is not limited to such embodiments and other types of audio compression techniques and other embodiments can be used to practice the invention.

In one specific embodiment, the incoming robocall detection information includes, but is not limited to, visual time-frequency waterfall plots. The server network device 20, 22, 24, 26 sends automatic robocall detection reports on a periodic basis to telecommunications carriers so they can shut down robocallers at robocall generation sources. The server network device 20, 22, 24, 26 interrogates Private Branch Exchange (PBX) origins of robocalls for telecommunications carriers to determine vulnerable defaults and software and mark PBXs as tainted because of the generation of robocalls. However, the present invention is not limited to such embodiments and other embodiments can be used to practice the invention However, the present invention is not limited to such embodiments and other embodiments can be used to practice the invention and other embodiments without the use of AI.

At Step 172, the robocall detection application 30 on the first network device 12 stores the captured set of incoming call data 13*a* on the first network device 12.

At Step 174, the robocall application 30 on the first network device 12 extracts from the captured set of incoming call data 13*a* for analysis including: amplitude levels of the captured call audio data, noise and distortion of the captured call audio data, pulse and transitions of the captured call audio data, waveforms of the captured call audio data, frequency characteristic of the captured call audio data, spectral characteristics of the captured audio data and/or time domain characteristics of the captured call audio data, to automatically identify entities, organizations, techniques, methods and equipment used for generating robocalls.

In one embodiment, Step 174, further includes analysis by the AI application 30*c* on the first network device 12. However, the present invention is not limited to such an embodiment and other embodiments without AI can be used to practice the invention.

In one embodiment, Step 174, further includes analyzing the call audio data from the captured set of incoming call data on the on the robocall detection application on the first network device to determine whether the captured call audio data includes actual live voice data, natural synthesized voice data and/or artificial synthesized voice data.

In such an embodiment, natural synthesized voice data includes actual voice data recorded by an actual human and stored in a database. An application that is originating robocalls then selects recorded words and phrases to create a natural synthesized voice that sounds like an actual human person. The application that is originating robocalls may also generate artificial synthesized voice data using a network device based, artificial voice application that does not sound like an actual person, but instead sounds like an automated person. However, the present invention is not limited to such embodiments and other embodiments may be used to practice the invention.

At Step 176, the robocall detection application 30 on the first network device 12 automatically deletes the stored captured set of incoming call data 13*a* on the first network device 12 after analysis is complete.

FIGS. 11A and 11B are a flow diagram illustrating a Method 178 for automatically blocking robocalls.

In FIG. 11A at Step 180, a second incoming call is received on the robocall detection application on the first network device via the communications network from the second network device, the incoming call not including any caller identification information. At Step 182, the robocall detection application on the first network device automatically captures a second set of incoming call data including audio data, metadata and record data from the second incoming call. At Step 184, the robocall detection application on the first network device analyzes the captured audio data from the second set of incoming call data including analyzing: amplitude levels of the captured audio data, noise and distortion of the captured audio data, pulse and transitions of the captured audio data, waveforms of the captured audio data, frequency characteristics of the captured audio data, spectral characteristics of the captured audio data and time domain characteristics of the captured audio data to automatically identify entities, organizations, techniques, methods and equipment used for generating robocalls. In FIG. 11B at Step 186, a test is conducted to determine automatically on the robocall detection application with the analyzed captured audio data if the second incoming call without any caller identification information is a robocall. If the second incoming call is a robocall at the test for Step 186, then at Step 188, automatically sending the second incoming call from the robocall detection application to a voice mail application on the first network device without any audio, visual and mechanical indication on the first network device that second incoming call was automatically sent to voice mail. If the second incoming call is not a robocall at the test for Step 186, then at Step 190, allowing the robocall detection application to initiate ringing for the second incoming call on the first network device.

The present invention is illustrated with an exemplary embodiment. However, the present invention is not limited to such an embodiment and other embodiments can be used to practice the invention.

In such an exemplary embodiment in FIG. 11A at Step at Step 180, a second incoming call 13' is received on the robocall detection application 30 on the first network device 12 via the communications network 18, 18' from the second network device 14, 16, 33, 98-104, 20, 22, 24, 26, the incoming call not including any caller identification information 21.

At Step 182, the robocall detection application 30 on the first network device 12 automatically captures a second set of incoming call data 13'*a* including audio data, metadata and record data from the second incoming call 13'.

At Step 184, the robocall detection application 30 on the first network device 12 analyzes the captured audio data from the captured set of incoming call data 13*a'* including analyzing: amplitude levels of the captured audio data, noise and distortion of the captured audio data, pulse and transitions of the captured audio data, waveforms of the captured audio data, frequency characteristics of the captured audio data, spectral characteristics of the captured audio data and time domain characteristics of the captured audio data to automatically identify entities, organizations, techniques, methods and equipment used for generating robocalls.

In FIG. 11B at Step 186, a test is conducted to determine automatically on the robocall detection application 30 with the analyzed captured audio data if the second incoming call 13' without any caller identification information 21 is a robocall.

If the second incoming call is a robocall at the test for Step 186, then at Step 188, automatically sending the second incoming call from the robocall detection application 30 to a voice mail application 30*e* on the first network device 12 without any audio, visual and mechanical indication on the first network device 12 that second incoming call 13' was automatically sent to voice mail.

If the second incoming call is not a robocall at the test for Step 186, then at Step 190, allowing the robocall detection application 30 to initiate ringing for the second incoming call 13' on the first network device 12.

FIGS. 12A, 12B, 12C and 12D are a flow diagram illustrating a Method 192 for automatically blocking robocalls.

Figure 12B:
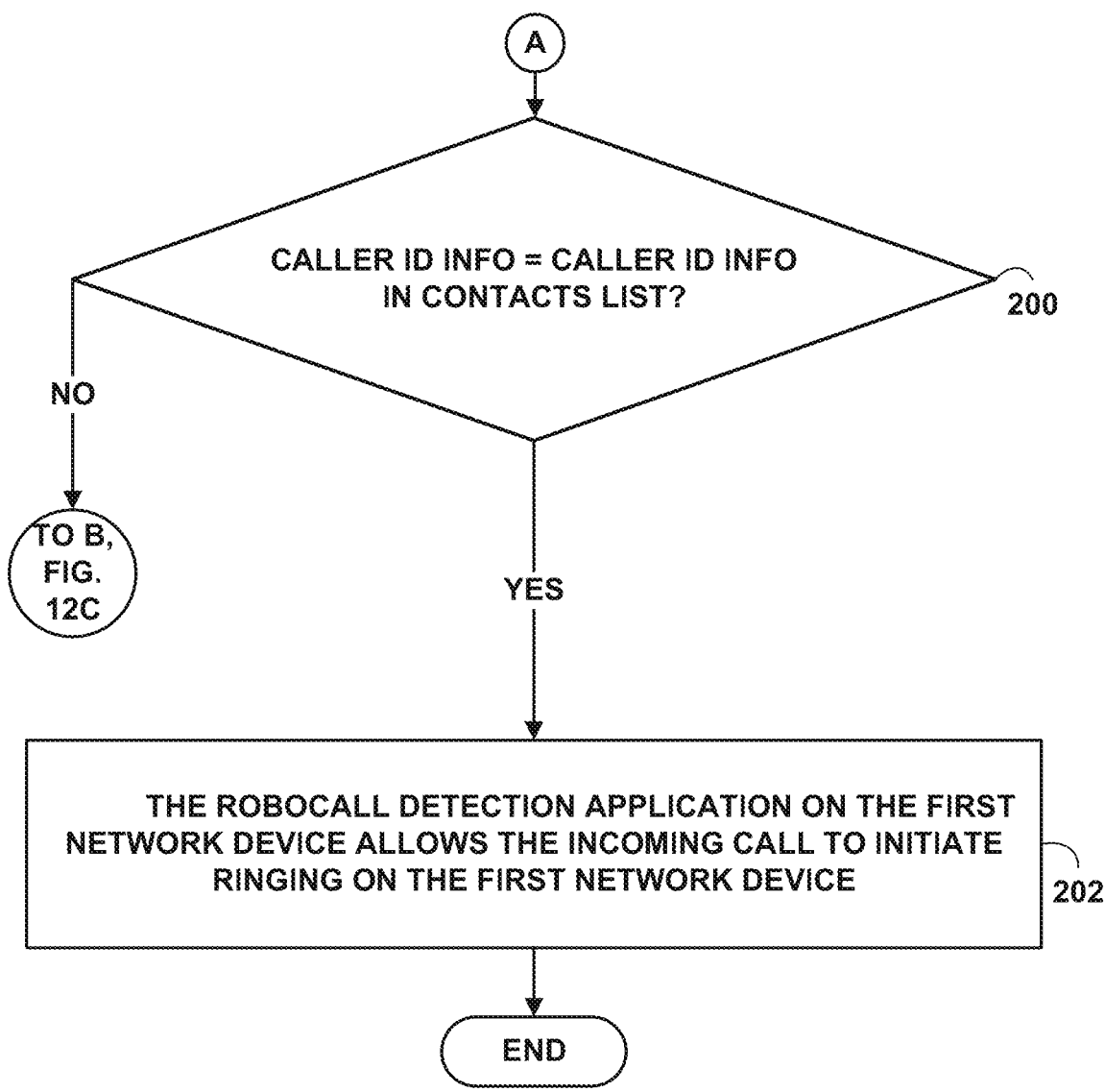

In FIG. 12A at Step 194, an incoming call is received on a robocall detection application on a first network device with one or more processors connected to a communications network from a second network device with one or more processors, the incoming call including caller identification information. At Step 196, a first test is conducted to determine automatically on the robocall detection application on the first network device if the caller identification information matches any caller identification stored in a list of outgoing call numbers collected for outgoing calls made on the first network device. If for the test at Step 198, the robocall detection application on the first network device automatically determines that the caller identification information from the incoming call matches any caller identification information stored in a list of outgoing call numbers collected for outgoing calls made on the first network device, then at Step 200, the robocall detection application is allowed to initiate ringing for the incoming call on the first network device. If for the test at Step 198, the robocall detection application on the first network device determines that the caller identification information from the incoming call does not match any caller identification stored in a list of outgoing call numbers collected for outgoing calls made on the first network device, then in FIG. 12B at Step 200, a second test is conducted to determine automatically on the robocall detection application on the first network device if the caller identification information from the incoming call matches any caller identification information stored in a list of contact numbers on the first network device. If for the test at Step 200, the caller identification information matches any caller identification stored in a list of contact numbers on the first network device, then at Step 202, the robocall detection application is allowed to initiate ringing for the incoming call on the first network device. If for the test at Step 200, the caller identification information does not match any caller identification information stored in a list of contact numbers on the first network device, then in FIG. 12C at Step 204, the robocall detection application on the first network device automatically captures a set of incoming call data from the incoming call. At Step 206, a third test is conducted on the the robocall detection application on the first network device automatically using the robocall detection application to determine whether the call is a voice based robocall using one or more robocall detection methods. The one or more robocal detection methods including, but not limited to, analyzing the captured call audio data, call metadata and call record data to identify any foreground audio characteristics and background audio characteristics from the incoming call generated by equipment, methods and techniques used by organizations generating robocalls. If the test at Step 206 the robocall detection application on the first network device determines the incoming call is not a robocall, then at Step 208, the robocall detection application on the first network device is allowed to initiate ringing for the incoming call on the first network device. If the test at Step 206 determines the incoming call is a voice based robocall, In FIG. 12D at Step 210, the robocall detection application on the first network device automatically designates the incoming call as a robocall. A Step 212, the robocall detection application on the first network device automatically sends the incoming call to a voice mail application on the first network device without any audio, visual and mechanical indication on the first network device that an incoming call was automatically sent to voice mail. At Step 214, the robocall detection application on the first network device adds call identification information and the set of incoming call data captured from the incoming call designated as a robocall to a database used by the robocall detection applicaiton to further find new correlations and to spot new trends related to new automatic robocall generation.

The present invention is illustrated with an exemplary embodiment. However, the present invention is not limited to such an embodiment and other embodiments can be used to practice the invention.

In such an exemplary embodiment in FIG. 12A at Step 194, on a first network device 12, 14, 16 (hereinafter incoming call 13 on first network device 12 for simplicity) with one or more processors connected to a communications network 18, 18' from a second network device 14, 16, 33, 98-104, 20, 22, 24, 26 with one or more processors, the incoming call 13 including caller identification information 21. The second network device includes one or more second target network devices 14, 16, 33, 98-104 and/or one or more server network devices 20, 22, 24, 26. However, the present invention is not limited to this embodiment, and other embodiments may be used to practice the invention.

In another embodiment, the incoming call 13 does not include any caller identification information 21. Method 192 is still used to determine if the incoming call is a voice and a robocall or not.

At Step 196, the robocall detection application 30 on the first network device 12 automatically conducts a first test to determine if the caller identification information 21 matches any caller identification information 21 stored in a list of outgoing call numbers 23 collected for outgoing calls made on the first network device 12. If the robocall detection application 30 on the first network device 12 determines with the first test at Step 196 that the caller identification information 21 matches any caller identification information 21 stored in the list of outgoing call numbers 23 collected for outgoing calls made on the first network device 12, then at Step 198, the robocall detection application 30 on the first network device 12 allows the incoming call to initiating ringing on the first network device 12.

If for the test at Step 196, the robocall detection application 30 on the first network device 12 determines that the caller identification information 21 does not match any caller identification information 21 stored in the list of outgoing call numbers 23 collected for outgoing calls made on the first network device, in FIG. 12B at Step 200, the robocall detection application 30 on the first network device 12 conducts a second test to determine if the caller identification information 21 matches any caller identification information 21 stored in a list of contact numbers 25 on the first network device 12. Most every network device includes a list application or database application that collects and stores a list of contacts on the network device.

If the robocall detection application 30 on the first network device 12 determines with the second test in FIG. 12B at Step 200, that the caller identification information 21 matches any caller identification information 21 stored in the list of contact numbers 25 on the first network device then at Step 202, robocall detection application 30 on the first network device allows the incoming call 13 to initiate ringing on the first network device 12.

If at FIG. 12B for the second test at Step 200, if the robocall detection application 30 on the first network device 12 determines that the caller identification information 21 does not match any caller identification information 21 stored in the list of contact numbers 25 on the first network device 12 then, the robocall detection application 30 on the first network device automatically determines if the incoming call 13 includes a voice call instead of a recording.

Figure 12C:
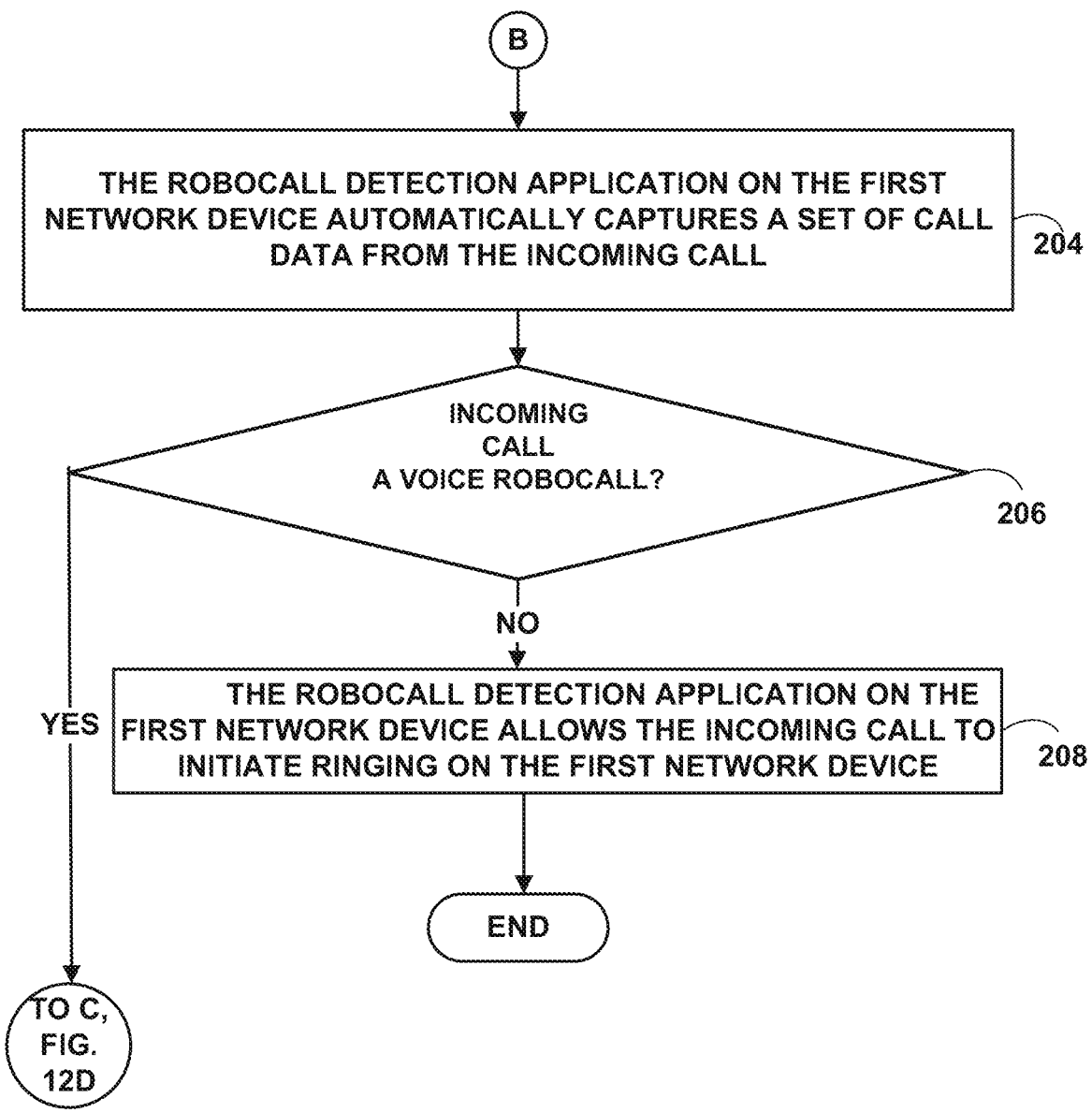

In FIG. 12C at Step 204, the robocall detection application 30 on the first network device 12 automatically captures a set of call incoming call data 13a from the incoming call, including, but not limited to, call audio data, call metadata and/or call record data. However, the present invention is not limited to such an embodiment and other embodiments can be used to practice the invention.

At Step, 206, a third test is conducted on the robocall detection application 30 on the first network device 12 automatically determines whether the incoming call 13 is a voice call and a robocall using one or more robcall detection methods. The one or more robocall detection methods including, but not limited to, analyzing the captured set of incoming call data 13a including the call audio data, call metadata and call record data to identify any foreground audio characteristics and any background audio characteristics from the incoming call 12 generated by equipment, methods and techniques used by organizations generating robocalls.

If the third test at Step 206, determines the incoming call 13 is a voice call and not a robocall, then at Step 208, the robocall detection application 30 on the first network device 12 is allowed to initiate ringing for the incoming call 13 on the first network device 12.

Figure 12D:
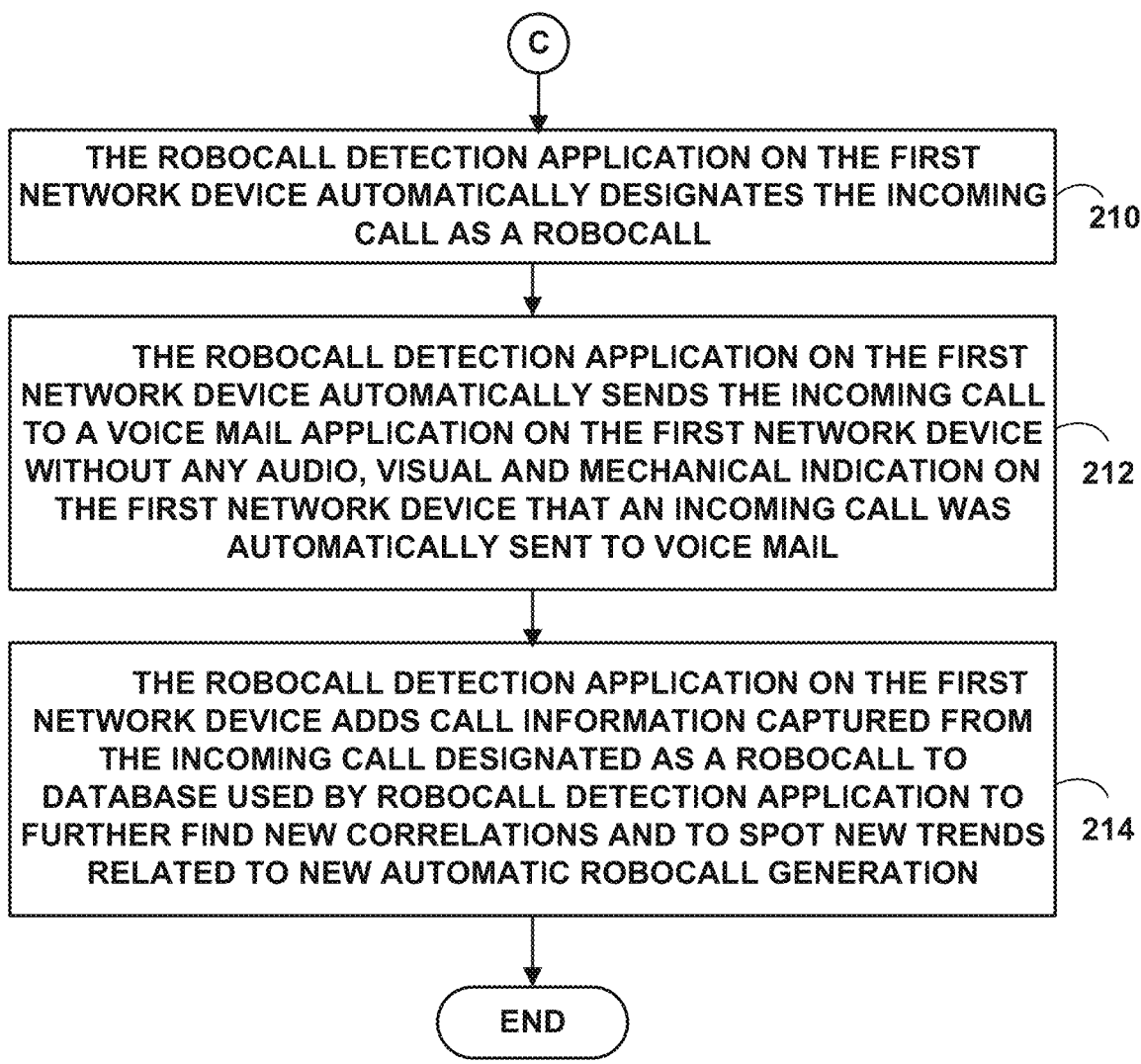

If the third test at Step 208, determines the incoming is a robocall, In FIG. 12D at Step 210, the robocall detection application 30 on the first network device 12 automatically designates the incoming call 13 as a robocall.

A Step 212, the robocall detection application 30 on the first network device 12 automatically sends the incoming call 13 to a voice mail application 30e on the first network device 12 without any audio, visual and mechanical indication on the first network device 12 that an incoming call 13 was automatically sent to voice mail.

At Step 214, the robocall detection application 30 on the first network device 12 adds the captured set of incoming call data 13a and the caller identification information 21 captured from the incoming call 13 designated as a robocall to a databased used by the robocall detection application 30 to further find new correlations and to spot new trends related to new automatic robocall generation.

A method and system of blocking robocalls is presented herein. A set of incoming call data is captured from the incoming call. The set of incoming call data, including captured audio data, is checked with plural different tests to determine if the robocall includes a voice call component. The plural different tests provide additional levels of detection for robocalls. The method and system automatically identify and process robocalls and help prevent call spoofing and neighbor spoofing by robocalls.

It should be understood that the architecture, programs, processes, methods and It should be understood that the architecture, programs, processes, methods and systems described herein are not related or limited to any particular type of computer or network system (hardware or software), unless indicated otherwise. Various types of specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

Therefore, all embodiments that come within the scope and spirit of the proceeding described and equivalents thereto and the following claims are identified and claimed as the invention.

We claim:

1. A method for automatically blocking robocalls, comprising: automatically creating from a robocall detection application on a first network device with one or more processors, a set of unique automated instructions to determine whether an incoming call is a robocall with an Artificial Intelligence (AI) application using one or more AI robocall knowledge based methods and a Big Data set, wherein the AI application automatically collects new data to add to the Big Data set to apply the one or more AI robocall knowledge based methods to find new correlations and to spot new trends related to new robocall generation when incoming calls are designated as robocalls, the created set of automated instructions including automatically detecting unique audio characteristic information from equipment used by organizations generating robocalls;

receiving an incoming call on the robocall detection application on the first network device with the one or more processors connected to a communications network from a second network device with one or more processors, the incoming call including caller identification information;

determining automatically on the robocall detection application on the first network device if the caller identification information matches any caller identification stored in a list of outgoing call numbers collected for outgoing calls made on the first network device, and if so, allowing the robocall detection application to initiate ringing for the incoming call on the first network device, and if not, determining automatically on the robocall detection application on the first network device if the caller identification information matches any caller identification stored in a list of contact numbers on the first network device, and if so, allowing the robocall detection application to initiate ringing for the incoming call on the first network device, and if not, determining automatically on the robocall detection application on the first network device if the incoming call includes a voice call by:

automatically capturing on the robocall detection application on the first network device a set of incoming call data from the incoming call;

automatically determining with the Artificial Intelligence (AI) application on the first network device whether the incoming call is from a robocall device using the created set of unique automated instructions created from the one or more AI robocall knowledge based methods, the created set of unique automated instructions including, analyzing the captured set of incoming call data to identify any foreground audio characteristics and any background audio characteristics from the incoming call generated by equipment, methods and techniques used by organizations generating robocalls;

if the incoming call is a voice call and a robocall, (a) automatically designating the incoming call as a robocall via the robocall detection application on the first network device, and (b) automatically sending the incoming call from the robocall detection application to a voice mail application on the first network device without any audio, visual and mechanical indication on the first network device that an incoming call was automatically sent to voice mail, and adding from the robocall application on the first network device the collected set of call data and the caller identification information from the incoming call designated as a robocall to a Big Data set used by the AI application to further find new correlations and to spot new trends related to new automatic robocall generation, and if the incoming call is a voice call and not a robocall, allowing the robocall detection application to initiate ringing for the incoming call on the first network device.

2. The method of claim 1 wherein the incoming call is received on a wired or wireless interface on the first network device.

3. The method of claim 1 wherein the incoming call includes a Voice over Internet Protocol (VoIP) incoming call.

4. The method of claim 1 wherein the incoming call includes a voice, video, audio or data call or an incoming Short Message Service (SMS) message or Rich Message Service (RCS) message.

5. The method of claim 1 wherein the first network and second network include: mobile phones, non-mobile phones with displays, smart phones, Internet phones, desktop computers, laptop computers, tablet computers, Internet appliances, personal digital/data assistants (PDA), portable, handheld and desktop video game devices, Internet of Things (IoT) devices, cable television (CATV), satellite television (SATV), high definition television (HDTV), three-dimensional (3DTV) television set-top boxes, satellite interfaces, Internet television (ITV), Web-TV, Internet Protocol Television (IPtv) connection devices, wearable network devices and smart speakers.

6. The method of claim 1 wherein the incoming call is received on a wireless communication interface on the first network device comprising: a near field communications (NFC), machine-to-machine (M2M) communications, Bluetooth (IEEE 802.15.1a), Infra data association (IrDA), IEEE 802.11a, 802.11ac, 802.11b, 802.11g, 802.11n, Wireless Fidelity (Wi-Fi), Wi-Fi Aware, Worldwide Interoperability for Microwave Access (WiMAX), ETSI High Performance Radio Metropolitan Area Network (HIPERMAN), cellular telephone, satellite, or low earth orbit satellite, wireless communications interface.

7. The method of claim 1 wherein the incoming call is received on a wired communication interface on the first network device comprising: wired interfaces and corresponding networking protocols for wired connections to a Public Switched Telephone Network (PSTN), cable television network (CATV), satellite television networks (SATV), three-dimensional television (3DTV) network, Internet television (ITV), Web-TV, Internet Protocol Television (IPtv), Ethernet, satellite network, and connect the first network device via the wired communications interface to the communications network via one or more twisted pairs of copper wires, digital subscriber lines, coaxial cables or fiber optic cables.

8. The method of claim 1 wherein the step of automatically capturing on the robocall detection application on the first network device a set of incoming call data from the incoming call further includes:
capturing on robocall detection application on the first network device in the set of incoming call data, call audio data, call metadata and call record data, from the incoming call;
storing the captured set of incoming call data on the robocall detection application on the first network device;
extracting from the captured set of incoming call data on the robocall application on the first network device for analysis including analysing: amplitude levels of the captured call audio data, noise and distortion of the captured call audio data, pulse and transitions of the captured call audio data, waveforms of the captured call audio data, frequency characteristic of the captured call audio data, spectral characteristics of the captured audio data or time domain characteristics of the captured call audio data, to automatically identify entities, organizations, techniques, methods and equipment used for generating robocalls; and
automatically deleting on the robocall detection application on the first network device the stored captured call information on the first network device after analysis is complete.

9. The method of claim 8 wherein the analyzing includes analyzing by the AI application on the first network device.

10. The method of claim 8 further including:
compressing incoming call audio data from captured set of incoming call data on the robocall detection application with one or more data compressing techniques; and
sending the compressed captured call audio data, the captured call metadata and the captured call record data to a server network device with one or more processors via the communications network, wherein the server network device stores and adds the compressed captured call audio data the captured call metadata and the captured call record data to the Big Data set used by the AI application on the first network device to further find new correlations and to spot new trends related to new automatic robocall generation.

11. The method of claim 10 further comprising:
displaying in real-time on a graphical display component on the server network device incoming robocall detection information.

12. The method of claim 1 wherein the step of the step of analyzing the captured set of incoming call data further includes:

analyzing the call audio data from the captured set of incoming call data on the on the robocall detection application on the first network device to determine whether the captured call audio data includes live voice data, natural synthesized voice data or artificial synthesized voice data.

13. The method of claim 12 further comprising:
analyzing the call audio data from the captured set of incoming call data on the robocall detection application for sequences of audio patterns and speech patterns with varying types of background noise including ambient noise, white noise, brown noise and pink noise.

14. The method of claim 1 wherein the step of analyzing the captured set of incoming call data, further includes:
analyzing amplitude levels of the captured audio data on the robocall detection application;
analyzing noise and distortion of the captured audio data on the robocall detection application;
analyzing pulse and transitions of the captured audio data on the robocall detection application;
analyzing waveforms of the captured audio data on the robocall detection application;
analyzing frequency characteristics of the captured audio data on the robocall detection application;
analyzing spectral characteristics of the captured audio data on the robocall detection application; or
analyzing time domain characteristics of the captured audio data on the robocall detection application,
to automatically identify entities, organizations, techniques, methods and equipment used for generating robocalls.

15. The method of claim 1 further including:
receiving a second incoming call on the robocall detection application on the first network device via the communications network from the second network device, the incoming call not including any caller identification information;
automatically capturing on the robocall detection application on the first network device a second set of incoming call data including: call audio data, call metadata and call record data from the second incoming call;
extracting a set of data from the captured call audio data from the second incoming call including: amplitude levels of the captured audio data, noise and distortion of the captured audio data, pulse and transitions of the captured audio data, waveforms of the captured audio data, frequency characteristic of the captured audio data or time domain characteristics of the captured audio data to automatically identify entities, organizations, techniques, methods and equipment used for generating robocalls; and
determining automatically on the robocall detection application with the extracted set of data if the second incoming call without any caller identification information is a robocall,
and if so, automatically sending the second incoming call from the robocall detection application to a voice mail application on the first network device without any audio, visual and mechanical indication on the first network device that second incoming call was automatically sent to voice mail, and
if not, allowing the robocall detection application to initiate ringing for the second incoming call on the first network device.

16. The method of claim 15 wherein the step of determining automatically on the robocall detection application with the extracted set of data if the second incoming call without any caller identification information is a robocall, and if so, further includes:
adding on the robocall detection application the extracted set of data from the captured call audio data from the second incoming call to the to the Big Data set used by the AI application on the first network to further find new correlations and to spot new trends related to new automatic robocall generation.

17. The method of claim 15 further comprising:
determining automatically on the AI application with the extracted set of data if the second incoming call without any caller identification information is a robocall.

18. A method for automatically blocking robocalls, comprising:
automatically creating from a robocall detection application on a first network device with one or more processors a set of unique automated instructions to determine whether an incoming call is a robocall using one or more robocall based methods, wherein the robocall application automatically collects new data to apply the created one or more robocall based methods to find new correlations and to spot new trends related to new robocall generation when incoming calls are designated as robocalls, the created set of unique automated instructions including automatically detecting unique audio characteristic information from equipment used by organizations generating robocalls; receiving an incoming call on the robocall detection application on the first network device with the one or more processors connected to a communications network from a second network device with one or more processors, the incoming call including caller identification information; determining automatically on the robocall detection application on the first network device if the caller identification information matches any caller identification stored in a list of outgoing call numbers collected for outgoing calls made on the first network device, and if so, allowing the robocall detection application to initiate ringing for the incoming call on the first network device, and if not, determining automatically on the robocall detection application on the first network device if the caller identification information matches any caller identification stored in a list of contact numbers on the first network device, and if so, allowing the robocall detection application to initiate ringing for the incoming call on the first network device, and if not, determining automatically on the robocall detection application on the first network device if the incoming call includes a voice call by:
automatically capturing on the robocall detection application on the first network device a set of incoming call data from the incoming call; automatically determining on the robocall detection application on the first network device whether the call is from a robocall device using the created set of unique automated instructions created from the one or more robocall based methods, the one or more created set of unique automated instructions including, analyzing the captured set of incoming call data to identify any foreground audio characteristics and any background audio characteristics from the incoming call generated by equipment, methods and techniques used by organizations generating robocalls;
if the incoming call is a voice call and a robocall, (a) automatically designating the incoming call as a robocall via the robocall detection application on the first network device, and (b) automatically sending the incoming call from the robocall detection application to a voice mail application on the first network device without any audio, visual and mechanical indication on the first network device that an incoming call was automatically sent to voice mail, and adding from the robocall application on the first network device the collected set of call data and the caller identification information from the incoming call designated as a robocall to a database used by robocall application on the first network device to further find new correlations and to spot new trends related to new automatic robocall generation, and if the incoming call is a voice call and not a robocall, allowing the robocall detection application to initiate ringing for the incoming call on the first network device.

19. A non-transitory computer readable medium have a plurality of instructions stored therein for causing one or more processors on one or more network devices to execute the steps of: automatically creating from a robocall detection application on a first network device with one or more processors, a set of unique automated instructions to determine whether an incoming call is a robocall with an Artificial Intelligence (AI) application using one or more AI robocall knowledge based methods and a Big Data set, wherein the AI application automatically collects new data to add to the Big Data set to apply the one or more AI robocall knowledge based methods to find new correlations and to spot new trends related to new robocall generation when incoming calls are designated as robocalls, the created set of automated instructions including automatically detecting unique audio characteristic information from equipment used by organizations generating robocalls;
receiving an incoming call on the robocall detection application on the first network device with the one or more processors connected to a communications network from a second network device with one or more processors, the incoming call including caller identification information;
determining automatically on the robocall detection application on the first network device if the caller identification information matches any caller identification stored in a list of outgoing call numbers collected for outgoing calls made on the first network device, and if so, allowing the robocall detection application to initiate ringing for the incoming call on the first network device, and if not, determining automatically on the robocall detection application on the first network device if the caller identification information matches any caller identification stored in a list of contact numbers on the first network device, and if so, allowing the robocall detection application to initiate ringing for the incoming call on the first network device, and if not, determining automatically on the robocall detection application on the first network device if the incoming call includes a voice call by:
automatically capturing on the robocall detection application on the first network device a set of incoming call data from the incoming call;
automatically determining with the Artificial Intelligence (AI) application on the first network device whether the incoming call is from a robocall device using the created set of unique automated instructions created from the one or more AI robocall knowledge based methods, the created set of unique automated instructions including, analyzing the captured set of incoming call data to identify any foreground audio characteristics and any background audio characteristics from the incoming call generated by equipment, methods and techniques used by organizations generating robocalls;

if the incoming call is a voice call and a robocall, (a) automatically designating the incoming call as a robocall via the robocall detection application on the first network device, and (b) automatically sending the incoming call from the robocall detection application to a voice mail application on the first network device without any audio, visual and mechanical indication on the first network device that an incoming call was automatically sent to voice mail, and adding from the robocall application on the first network device the collected set of call data and the caller identification information from the incoming call designated as a robocall to a Big Data set used by the AI application to further find new correlations and to spot new trends related to new automatic robocall generation, and if the incoming call is a voice call and not a robocall, allowing the robocall detection application to initiate ringing for the incoming call on the first network device.

20. A system for automatically blocking recorded robocalls, comprising in combination:

a communications network;

two or more network devices each with one or more processors;

for automatically creating from a robocall detection application on a first network device with one or more processors, a set of unique automated instructions to determine whether an incoming call is a robocall with an Artificial Intelligence (AI) application using one or more AI robocall knowledge based methods and a Big Data set, wherein the AI application automatically collects new data to add to the Big Data set to apply the one or more AI robocall knowledge based methods to find new correlations and to spot new trends related to new robocall generation when incoming calls are designated as robocalls, the created set of automated instructions including automatically detecting unique audio characteristic information from equipment used by organizations generating robocalls;

for receiving an incoming call on the robocall detection application on the first network device with one or more processors connected to a communications network from a second network device with one or more processors, the incoming call including caller identification information;

for determining automatically on the robocall detection application on the first network device if the caller identification information matches any caller identification stored in a list of outgoing call numbers collected for outgoing calls made on the first network device, and if so, for allowing the robocall detection application to initiate ringing for the incoming call on the first network device, and if not, for determining automatically on the robocall detection application on the first network device if the caller identification information matches any caller identification stored in a list of contact numbers on the first network device, and if so, for allowing the robocall detection application to initiate ringing for the incoming call on the first network device, and if not, for determining automatically on the robocall detection application on the first network device if the incoming call includes a voice call by:

for automatically capturing on the robocall detection application on the first network device a set of incoming call data from the incoming call;

for automatically determining with the Artificial Intelligence (AI) application on the first network device whether the incoming call is from a robocall device using the created set of unique automated instructions created from the one or more AI robocall knowledge based methods, the created set of unique automated instructions including instructions, for analyzing the captured set of incoming call data to identify any foreground audio characteristics and any background audio characteristics from the incoming call generated by equipment, methods and techniques used by organizations generating robocalls;

if the incoming call is a voice call and a robocall, (a) for automatically designating the incoming call as a robocall via the robocall detection application on the first network device, and (b) for automatically sending the incoming call from the robocall detection application to a voice mail application on the first network device without any audio, visual and mechanical indication on the first network device that an incoming call was automatically sent to voice mail, and for adding from the robocall application on the first network device the collected set of call data and the caller identification information from the incoming call designated as a robocall to a Big Data set used by the AI application to further find new correlations and to spot new trends related to new automatic robocall generation, and if the incoming call is a voice call and not a robocall, for allowing the robocall detection application to initiate ringing for the incoming call on the first network device.

* * * * *